(12) United States Patent
Hay et al.

(10) Patent No.: US 11,816,845 B1
(45) Date of Patent: Nov. 14, 2023

(54) MEASURING THE SPEED OF ROTATION OR RECIPROCATION OF A MECHANICAL COMPONENT USING ONE OR MORE CAMERAS

(71) Applicant: RDI TECHNOLOGIES, INC., Knoxville, TN (US)

(72) Inventors: Jeffrey R. Hay, Prospect, KY (US); Kenneth Ralph Piety, Knoxville, TN (US); Mark William Slemp, Tellico Plains, TN (US); Joseph A. Vrba, Clinton, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 18/094,437

(22) Filed: Jan. 9, 2023

Related U.S. Application Data

(60) Continuation of application No. 17/829,798, filed on Jun. 1, 2022, now Pat. No. 11,557,043, which is a
(Continued)

(51) Int. Cl.
*G06T 7/246* (2017.01)
*G06T 7/00* (2017.01)
(Continued)

(52) U.S. Cl.
CPC ............... *G06T 7/246* (2017.01); *G01P 3/38* (2013.01); *G06T 7/0004* (2013.01); *G06T 7/292* (2017.01); *G06T 2207/10016* (2013.01); *G06T 2207/20056* (2013.01); *G06T 2207/20104* (2013.01); *G06T 2207/30164* (2013.01)

(58) Field of Classification Search
CPC ....... G06T 7/246; G06T 7/292; G06T 7/0004; G06T 2207/100016; G06T 2207/20056; G06T 2207/20104; G06T 2207/30164; G01P 3/38
See application file for complete search history.

(56) References Cited

U.S. PATENT DOCUMENTS 5,517,251 A  5/1996  Rector et al.
5,666,157 A  9/1997  Aviv
(Continued)

OTHER PUBLICATIONS

Hay, J.R. High Dynamic Range Imaging for the Detection of Motion\ pp. 18-141: dissertation University of Louisville (Kentucky); May 2011.
(Continued)

*Primary Examiner* — Kenny A Cese
(74) *Attorney, Agent, or Firm* — Wyatt, Tarrant & Combs, LLP; Stephen C. Hall

(57) ABSTRACT

Present embodiments pertain to systems, apparatuses, and methods for analyzing and reporting rotational or reciprocating movements and speed of rotation or reciprocation in mechanical structures, machines, and machine components, through the use of an acquired video recording representing a plurality of cycles of motion, by measuring intensity values of a subset of pixels contained in a region of interest within the video recording in a plurality of frames of the video recording, thereby calculating a speed of rotation or reciprocation of the structure, machine or machine component.

1 Claim, 20 Drawing Sheets

Related U.S. Application Data division of application No. 17/153,175, filed on Jan. 20, 2021, now Pat. No. 11,373,317.

(60) Provisional application No. 62/965,382, filed on Jan. 24, 2020.

(51) Int. Cl.
  *G06T 7/292* (2017.01)
  *G01P 3/38* (2006.01)

(56) References Cited

U.S. PATENT DOCUMENTS

| | | | |
|---|---|---|---|
| 6,028,626 A | 2/2000 | Aviv | |
| 6,094,989 A * | 8/2000 | Twerdochlib | G01N 29/46 |
| | | | 702/56 |
| 6,295,383 B1 | 9/2001 | Smitt et al. | |
| 6,422,741 B2 | 7/2002 | Murphy et al. | |
| 6,456,296 B1 | 9/2002 | Cataudella | |
| 6,727,725 B2 | 4/2004 | Devaney et al. | |
| 6,774,601 B2 | 8/2004 | Schwartz et al. | |
| 6,792,811 B2 | 9/2004 | Argento et al. | |
| 7,622,715 B2 | 11/2009 | Ignatowicz | |
| 7,672,369 B2 | 3/2010 | Garakani et al. | |
| 7,710,280 B2 | 5/2010 | McLellan | |
| 7,862,188 B2 | 1/2011 | Luty et al. | |
| 7,903,156 B2 | 3/2011 | Nobori et al. | |
| 8,119,986 B1 | 2/2012 | Garvey, III et al. | |
| 8,149,273 B2 | 4/2012 | Liu et al. | |
| 8,170,109 B2 | 5/2012 | Gaude et al. | |
| 8,242,445 B1 | 8/2012 | Scanion et al. | |
| 8,351,571 B2 | 1/2013 | Brinks et al. | |
| 8,374,498 B2 | 2/2013 | Pastore | |
| 8,475,390 B2 | 7/2013 | Heaton et al. | |
| 8,483,456 B2 | 7/2013 | Nagatsuka et al. | |
| 8,502,821 B2 | 8/2013 | Louise et al. | |
| 8,515,711 B2 | 8/2013 | Mitchell et al. | |
| 8,523,674 B2 | 9/2013 | Patti | |
| 8,537,203 B2 | 9/2013 | Seibel et al. | |
| 8,693,735 B2 | 4/2014 | Kielkopf et al. | |
| 8,720,781 B2 | 5/2014 | Wang et al. | |
| 8,731,241 B2 | 5/2014 | Johnson et al. | |
| 8,765,121 B2 | 7/2014 | Maslowski et al. | |
| 8,774,280 B2 | 7/2014 | Tourapis et al. | |
| 8,797,439 B1 | 8/2014 | Coley et al. | |
| 8,803,977 B2 | 8/2014 | Uchima et al. | |
| 8,811,708 B2 | 8/2014 | Fischer et al. | |
| 8,823,813 B2 | 9/2014 | Manzel et al. | |
| 8,831,370 B2 | 9/2014 | Archer | |
| 8,874,374 B2 | 10/2014 | Bogucki | |
| 8,879,789 B1 | 11/2014 | Figov et al. | |
| 8,879,894 B2 | 11/2014 | Neuman et al. | |
| 8,884,741 B2 | 11/2014 | Cavallaro et al. | |
| 8,897,491 B2 | 11/2014 | Ambrus et al. | |
| 8,924,163 B2 | 12/2014 | Hudson et al. | |
| 9,006,617 B2 | 4/2015 | Mullen | |
| 9,075,136 B1 | 7/2015 | Joao | |
| 9,805,475 B2 | 10/2017 | Rubinstein et al. | |
| 2004/0032924 A1 | 2/2004 | Judge, Jr. | |
| 2004/0081369 A1 | 4/2004 | Gindele et al. | |
| 2004/0160336 A1 | 8/2004 | Hoch et al. | |
| 2004/0184529 A1 | 9/2004 | Henocq et al. | |
| 2006/0009700 A1 | 1/2006 | Brumfield et al. | |
| 2006/0049707 A1 | 3/2006 | Vuyyuru | |
| 2006/0147116 A1 | 7/2006 | Le Clerc et al. | |
| 2006/0251170 A1 | 11/2006 | Ali | |
| 2007/0061043 A1 | 3/2007 | Ermakov et al. | |
| 2007/0276270 A1 | 11/2007 | Tran | |
| 2009/0010570 A1 | 1/2009 | Yamada et al. | |
| 2010/0033579 A1 | 2/2010 | Yokohata et al. | |
| 2010/0042000 A1 | 2/2010 | Schuhrke et al. | |
| 2010/0091181 A1 | 4/2010 | Capps | |
| 2010/0110100 A1 | 5/2010 | Anandasivam | |
| 2010/0324423 A1 | 12/2010 | El-Aklouk et al. | |
| 2010/0328352 A1 | 12/2010 | Shamier et al. | |
| 2011/0019027 A1 | 1/2011 | Fujita et al. | |
| 2011/0152729 A1 | 6/2011 | Oohashi et al. | |
| 2012/0207218 A1 | 8/2012 | Asamura et al. | |
| 2013/0060571 A1 | 3/2013 | Soemo et al. | |
| 2013/0176424 A1 | 7/2013 | Weil | |
| 2013/0201316 A1 | 8/2013 | Binder et al. | |
| 2013/0342691 A1 | 12/2013 | Lewis et al. | |
| 2014/0002667 A1 | 1/2014 | Cheben et al. | |
| 2014/0072190 A1 | 3/2014 | Wu et al. | |
| 2014/0072228 A1 | 3/2014 | Rubinstein et al. | |
| 2014/0072229 A1 | 3/2014 | Wadhwa et al. | |
| 2014/0112537 A1 | 4/2014 | Frank et al. | |
| 2014/0169763 A1 | 6/2014 | Nayak et al. | |
| 2014/0205175 A1 | 7/2014 | Tanaka et al. | |
| 2014/0236036 A1 | 8/2014 | de Hann et al. | |
| 2014/0341470 A1 | 11/2014 | Lee et al. | |
| 2014/0368528 A1 | 12/2014 | Konnola | |
| 2015/0134545 A1 | 5/2015 | Mann et al. | |
| 2015/0221534 A1 | 8/2015 | van der Meulen | |
| 2016/0171309 A1 | 6/2016 | Hay | |
| 2016/0217587 A1 | 7/2016 | Hay | |
| 2016/0217588 A1 * | 7/2016 | Hay | G06T 7/262 |
| 2016/0232686 A1 | 8/2016 | Park et al. | |
| 2016/0300341 A1 | 10/2016 | Hay et al. | |
| 2017/0000356 A1 | 1/2017 | Smith, Sr. | |
| 2017/0000392 A1 | 1/2017 | Smith | |
| 2017/0050080 A1 * | 2/2017 | Mizuochi | G16H 20/30 |
| 2017/0119258 A1 | 5/2017 | Kotanko | |
| 2017/0135626 A1 | 5/2017 | Singer | |
| 2017/0221216 A1 | 8/2017 | Chen | |
| 2018/0061063 A1 | 3/2018 | Buyukozturk | |
| 2018/0177464 A1 | 6/2018 | DeBusschere | |
| 2018/0225803 A1 | 8/2018 | Elgharib | |
| 2018/0276823 A1 | 9/2018 | Barral | |
| 2018/0296075 A1 | 10/2018 | Meglan | |
| 2018/0335366 A1 | 11/2018 | Qiao | |
| 2019/0206068 A1 | 7/2019 | Stark | |
| 2020/0029891 A1 | 1/2020 | Swisher | |
| 2020/0065957 A1 | 2/2020 | Hay | |

OTHER PUBLICATIONS

Liu et al., "Motion magnification", ACM Transactions on Graphics (TOG)—Proceedings of ACM SIGGRAPH 2005 TOG Homepage, vol. 24 Issue 3, Jul. 2005.

Mazen, et al.; A vision-based approach for the direct measurement of displacements in vibrating systems; article from Smart Materials and Structures; 2003; 12; pp. 785-794; IOP Publishing Ltd; UK.

Meyer S., Sorkine-Hornung A., Gross M. (2016) Phase-Based Modification Transfer for Video. In: Leibe B., Matas J., Sebe N., Welling M. (eds) Computer Vision—ECCV 2016. ECCV 201 6. Lecture Notes in Computer Science, vol. 9907. Springer, Cham. (Year: 2016).

Miyatake K, Yamagishi M, Tanaka N, Uematsu M, Yamazaki N, Mine Y, Sano A, Hirama M. New method for evaluating left ventricular wall motion by color-coded tissue Doppler imaging: in vitro and in vivo studies. J Am Coll Cardiel. Mar. 1, 1995 :25(3):717-24 (Year: 1995).

Nobuo Yamazaki et al "Analysis of Ventricular Wall Motion Using Color-Coded Tissue Doppler Imaging System" 1994 Jpn. J. Appl. Phys. 33 3141 (Year: 1994).

"Rubinstein et al. ("Revealing Invisible Changes In The World" (YouTube)", YouTube https://www.youtube.com/watch?v=e9ASH8IBJ2U, 2012.

"Wadhwa et al., ""Phase-based Video Motion Processing"", also see YouTube https://www.youtube.com/watch?v=W7ZQFG7Nvw, SIGGRAPH 2013".

Wu et al., "Eulerian Video Magnification for Revealing Subtle Changes in the World", ACM Transactions on Graphics (TOG)—Proceedings of ACM SIGGRAPH 2012 TOG Homepage, vol. 31 Issue 4, Jul. 2012, Article No. 65.

* cited by examiner

FIGURE 1A

MEASURING THE SPEED OF ROTATION OR RECIPROCATION OF A MECHANICAL COMPONENT USING ONE OR MORE CAMERAS

CROSS REFERENCE TO RELATED U.S. APPLICATION

This patent application is a continuation application of, and claims benefit of and priority to U.S. Nonprovisional Utility application Ser. No. 17/829,798, filed Jun. 1, 2022 and issued as U.S. Pat. No. 11,557,043 on Jan. 17, 2023, which was a divisional application of and claimed benefit of priority to U.S. Nonprovisional Utility application Ser. No. 17/153,175, filed Jan. 20, 2021 and issued as U.S. Pat. No. 11,373,317 on Jun. 28, 2022, which claimed the benefit of priority to U.S. Provisional Patent Application No. 62/965,382, filed on Jan. 24, 2020, the contents of all of which are fully incorporated by reference herein.

FIELD OF INVENTION

The present embodiments pertain to systems, apparatuses, and methods for analyzing movements in machinery, machine components, and inanimate physical structures, particularly motion characterized by torsional vibration and processing of visual data related to such movements.

BACKGROUND

All machines and physical structures produce vibrations and resonances of various kinds, some of which may be characteristic of normal operation and others of which may indicate off-normal conditions, unusual wear, incipient failure, or other problems. In the field of predictive maintenance, the detection of vibrational signatures is a key element of the diagnostic process in which the goal is to identify and remedy incipient problems before a more serious event such as breakdown, failure, or service interruption occurs. When analyzing the vibration frequency spectrum of a mechanical component, it is critical to have an accurate knowledge of the frequency at which the machine rotates or reciprocates. The identity of all the peaks present in the frequency spectrum is tied to the ratio of the frequency of a peak to the operating frequency. This ratio is referred to as the order of the frequency peak and often frequency is displayed with the x-axis (frequency) in orders. The measurement of the frequency of rotation or reciprocation can be accomplished using both contact and noncontact methods. When there is adequate access to the shaft of the machine, instruments with rubber rotating wheels can be placed against the shaft. Noncontact methods usually employ optical sensors, such as laser-based tachometers, or displacement probes to measure the speed. In these cases, it is most helpful for there to be reflective tape applied to the shaft or for the shaft to have a mechanical discontinuity such as a keyway that will serve to generate a once per revolution pulse that can be converted by an electronic instrument to provide a readout of the machine operating frequency. Some laser-based instruments have been developed which capture reflected light from the shaft and determine the operational frequency using autocorrelation or the Fast Fourier Transform (FFT) algorithm to automatically locate the desired frequency and calculate, record, and display the rotational speed of a machine or machine component. Moreover, there are numerous vendors that sell speed sensors which utilize contact wheels or once-per-rev discontinuities on the shaft. Stroboscopes can also be used to measure speed by freezing the motion of a component using a flashing light source.

Notwithstanding such capability, there are several disadvantages to using an external tachometer or stroboscope to measure the speed of operation of a machine that is being analyzed using video recording. In addition to the need to own or have access to these additional instruments at the troubleshooting site, the use of these instruments may result in the following disadvantages: access to or contact with moving components, stopping the machine to apply reflective tape or to mount a sensor in close proximity to the shaft, or holding an optical or laser tachometer or stroboscope with minimal motion, and synchronizing the speed with the video recording of the vibratory motion.

An alternative to the use of these known methods for measuring the machine speed is to use the same camera sensor that will record the motion of the machine and apply specialized processing algorithms to identify the speed. This process is much simpler and does not require the expense of a tachometer instrument and the additional time to setup and make the speed measurement. The normal measurement of the motion in a recorded video is based on the change in the pixel intensity in the scene and determines motion along the two axes which are orthogonal to the line of sight between the camera and the objects in the scene. In most cases, the measurement is based on comparing the pixel in one frame to the corresponding pixel in the following frames. When a shaft or other component of a machine is rotating or reciprocating, the position of pixels corresponding to such object generally will be associated with a different portion of the machine in each frame. For example, when looking at a rotating shaft, the light intensity present at the same pixel in each frame is reflected from different angular positions on the shaft as it rotates. This same phenomenon is true for a reciprocating shaft. By determining a frequency of rotation or reciprocation, recordings which are captured with negligible time delay can be synchronized with the measured frequency with high confidence that the machine speed has not changed. It also is true that if speed measurements are taken at different points in time and are substantially the same, it is unlikely that there have been large speed deviations during the data recording. The objective, therefore, has been to develop a more efficient system or processing method that does not rely upon contact with the machine or component, which determines a frequency of rotation or reciprocation—a determination which would be associated with the component's speed as well.

In addition to measuring the average speed of a rotating or reciprocating machine element, it may be important to determine how the rotational speed is changing during each cycle of repetition. These changes provide a means of measuring torsional vibration which characterizes the twisting motion of a shaft or angular vibration. Torsional measurements are made in the angular domain and often expressed in units of degrees. Various combinations of equipment components such as internal combustion engines, reciprocating compressors, flywheels, universal joints, couplings, gearing, blading, etc. can affect the torsional characteristics of the entire system. Torsional vibrations may also be affected by drive, operating or load conditions and may vary with the frequency of operation.

Torsional measurements can be made using strain gauges, optical sensors, or proximity probes which are focused on a component that has equally spaced divisions embedded or attached to the component. Commonly a geared element or reflective tape which has been marked with equally spaced lines is attached to the shaft in one or more locations and a tachometer is used to measure the time between each pulse in the waveform that is generated. The measurement of torsional twist, or the twist angle, between two points along a shaft or through a gear train may be derived from a pair of tachometer signals, one at each end of the shaft. Typically, the tachometer signals would be derived from gear teeth giving a known number of pulses per revolution. For example, in the case of a crankshaft, a 20-tooth gear wheel might be attached to the front end giving 20 pulses per revolution and a 60-tooth gear wheel might be attached to the rear end of a shaft giving 60 pulses/revolutions when measured with an inductive or eddy current probe. With the proper mathematical transformation applied, the minimum, maximum, and mean torsional vibration amplitude or its full frequency spectrum can be determined. The application of a tape with evenly spaced lines circumferentially can be used to provide equivalent results; however, there is some additional mathematical processing needed to handle the position of overlap which will cause one interval that is unequal from the others. These approaches, however, do not use or take advantage of the capabilities of digital photography and recording of such machines and components in motion.

The use of digital photography to make non-contacting measurements of torsional vibrations provides a much simpler system that is easier to implement while providing equivalent or improved accuracy over existing methods. The inventive embodiments herein may require one or more cameras depending on the ability to get all measurement locations in a single field of view. The measurements can be made using the standard gear wheels, or by wrapping a graduated tape or a tape with a uniform pattern, such as honeycomb, triangular, or diamond grid around the shaft.

SUMMARY

Present embodiments pertain to systems, apparatuses, and methods for analyzing and reporting the movements in mechanical structures, machinery, and machine components, including measuring the speed of rotation or reciprocation of a component on the structure which is useful in identifying other frequencies measured on the structure. In some aspects, the use of a gear wheel or a graduated or patterned tape wrapped around the shaft allows for instantaneous speed measurements within each cycle of repetition and torsional vibration measurements to be made. Given that a position on a rotating or reciprocating component changes pixel locations in the field of view and may even be temporarily hidden from the field of view, special processing of the visual data is provided for herein which facilitates measurement of motion associated with the rotating or reciprocating component in the field of view. In other aspects of present embodiments herein, image processing algorithms utilize repeating patterns which occur in the video data to measure the speed of the asset. The above capabilities provide further benefits because the sensor (video camera, in some embodiments) does not contact the machine, component or mechanical structure being studied, and efficiency of the process may be further enhanced by using the same camera that will be employed to analyze motion in the scene.

In an exemplary embodiment, the user (user and analyst are used interchangeably herein) follows the typical steps necessary to obtain good recordings:

1. Position the camera to acquire the perspective of the equipment of interest, containing at least a portion of the rotating or reciprocating component, 2. Focus the camera, and 3. Adjust the aperture; this may require the addition of external light or shielding the field of view in the presence of bright light conditions to achieve acceptable lighting conditions for recording.

At this point, the user only needs to request a speed calculation, provide an estimated speed value, and select a location on the component whose speed is to be measured. The software will adjust the size of the image using the user selected region of interest to obtain an improved view of the location being measured, optionally adjust the bit depth to 12-bit resolution, determine an appropriate acquisition frame rate, collect a short recording, and calculate the speed of the identified component. The user can then proceed to acquire the desired recording and the system will reset the acquisition parameters to the recording parameters that had been selected and begin collecting data. As described more fully herein, in some embodiments, this speed of the asset is stored with the recording. This stored speed value can be used to produce order-based data graphs. In regards to settings of the recording device to obtain useful recordings, U.S. Pub. No. 2016/0300341 (Ser. No. 14/999,660, filed Jun. 9, 2016) titled "Apparatus and Method for Visualizing Periodic Motions in Mechanical Components" (Hay, Jeffrey R., et al.; published Oct. 13, 2016 and subsequently issued as U.S. Pat. No. 10,062,411), the contents of which are fully incorporated by reference herein, describes among other features a user interface as part of a system that, among other capabilities, allows the selection of at least one component whose frequency of movement is measured as being relevant to the operation of a machine, e.g., a frequency of movement for a component used to drive tension in a cable.

In addition, U.S. Pub. No. 2016/0171309 (Ser. No. 14/757,255, filed Dec. 9, 2015) titled "Non-contacting monitor for bridges and civil structures" (Hay, Jeffrey R.; published Jun. 16, 2016 and subsequently issued as U.S. Pat. No. 9,704,266) describes the contents of which are fully incorporated by reference herein, describes among other features a user-controlled movable area selector on a graphical user interface, which enables the selection of a region of interest within a scene. In certain described aspects, such a system provides a display of a physical parameter, including displacement versus time for one or more components within the region of interest including calculated data such as values of time and displacement, such that from amplitude (displacement) and frequency motion is evaluated and used to determine the damping of a civil structure.

In an exemplary embodiment to measure torsional vibration, the user follows the typical steps necessary to obtain good recordings:

1. Attach one or more gear wheels or tape with an appropriate pattern to the shaft in selected locations or use existing elements if appropriate for such a measurement.

2. Position the camera to acquire the perspective of the equipment of interest, containing at least a portion of the rotating or reciprocating component where the target(s) of interest are in the field of view (use an additional camera whose sampling is synchronized with the first camera if necessary to view all target positions adequately).

3. Focus the camera, and

4. Adjust the aperture; it may be necessary to add external light or shield the field of view in the presence of brightly lit conditions to achieve acceptable lighting conditions for recording.

5. Establish a sampling rate high enough to view the highest order of torsional vibration of interest and a duration of M cycles of repetition necessary to view the lowest fractional order (1/M) of interest and make a recording.

At this point, the user only needs to position a region of interest upon the locations where the targets are mounted and request a torsional vibration calculation. The system will determine the average frequency of repetition as well as minimum, maximum, and mean torsional vibration amplitude and its full frequency spectrum. This average speed value can be used to produce order-based torsional vibration graphs. If more than one target is mounted on the shaft, then differential measurements can be calculated or graphs from the respective locations can be overlaid or stacked to compare behavior at the different locations.

It is known that an intensity of light present at the same pixel in each frame is reflected from different angular positions on the shaft or other component as it rotates or reciprocates. In the present embodiments, processing in accordance with one or more algorithms described herein is applied to model this motion and recognize the frequency of rotation, or of reciprocation. Once the frequency of rotation or reciprocation has been determined in accordance with the present embodiments, the repeating patterns of motion which occur in the video data allow a user to direct or use the methods herein to capture recordings with negligible time delay to be synchronized with the measured frequency with high confidence that the machine or component speed has not changed. If the duration of the measurement is large, then it may be desirable to measure the frequency of operation a second time as soon as the data recording is complete. If both speed measurements are the same, it is unlikely that there have been large speed deviations during the data recording, and the measurements afforded by multiple embodiments and alternatives herein provides a reliable measurement of the speed of the asset with no contact of the moving component needed to analyze motion in a scene. In an alternate embodiment, the speed measurement may be performed on the same recording used to measure the orthogonal vibrations in the field of view if the frame acquisition rate of the recording is sufficient to resolve the frequency of rotation or reciprocation.

BRIEF DESCRIPTION OF DRAWINGS

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

FIG. 1A and 1B illustrate an exemplary setup screen used for standard data acquisition when recording the dynamic motion of a machine, according to multiple embodiments and alternatives.

MULTIPLE EMBODIMENTS AND ALTERNATIVES

In some aspects of the present disclosure, in accordance with multiple embodiments and alternatives, a user in the operation of present embodiments measures the speed of rotation or reciprocation of an element on a mechanical structure, a machine or machine component without contacting the structure using the same camera that will be employed to investigate the dynamic motion of the mechanical structure.

Figure 1A:
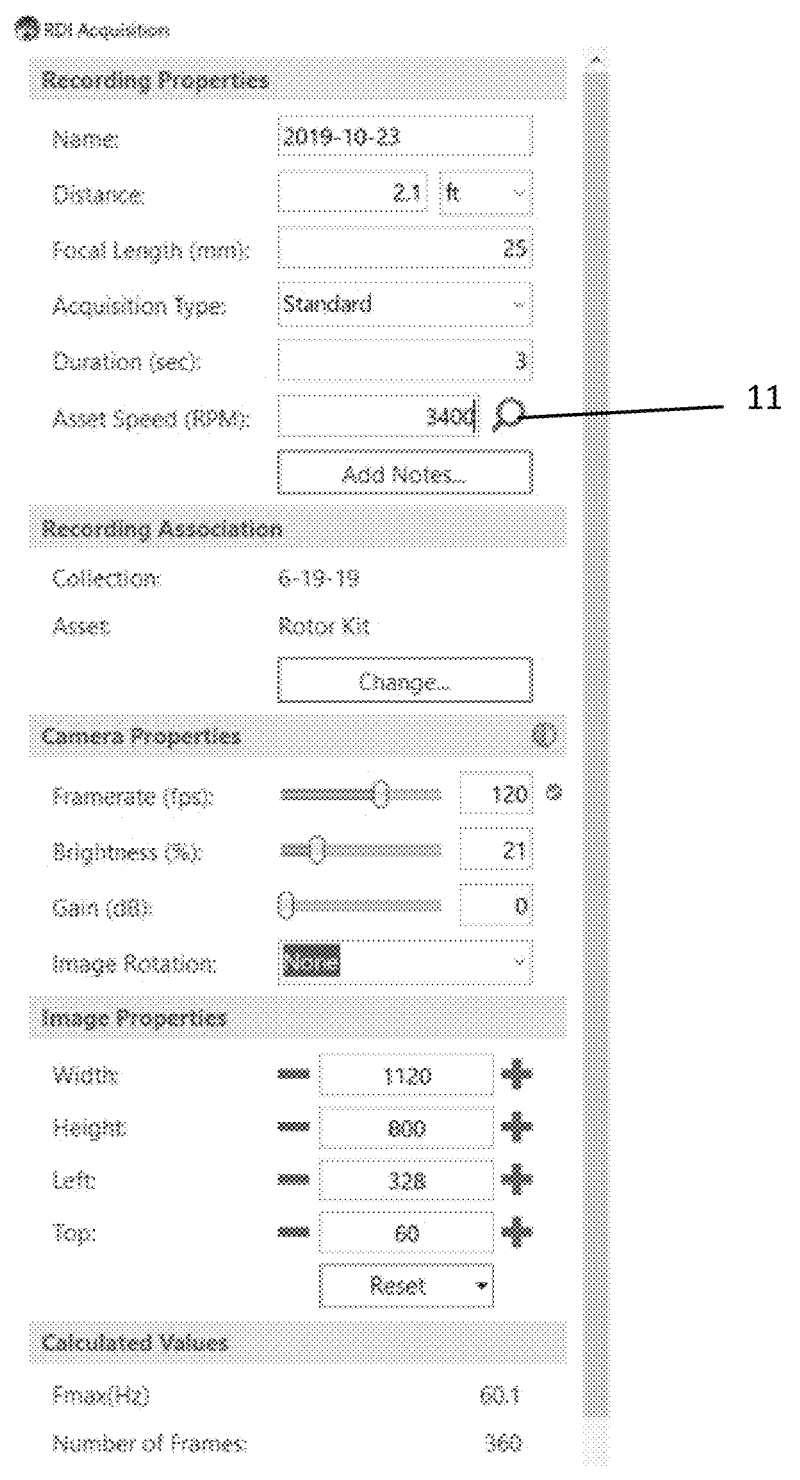
Figure 1B:
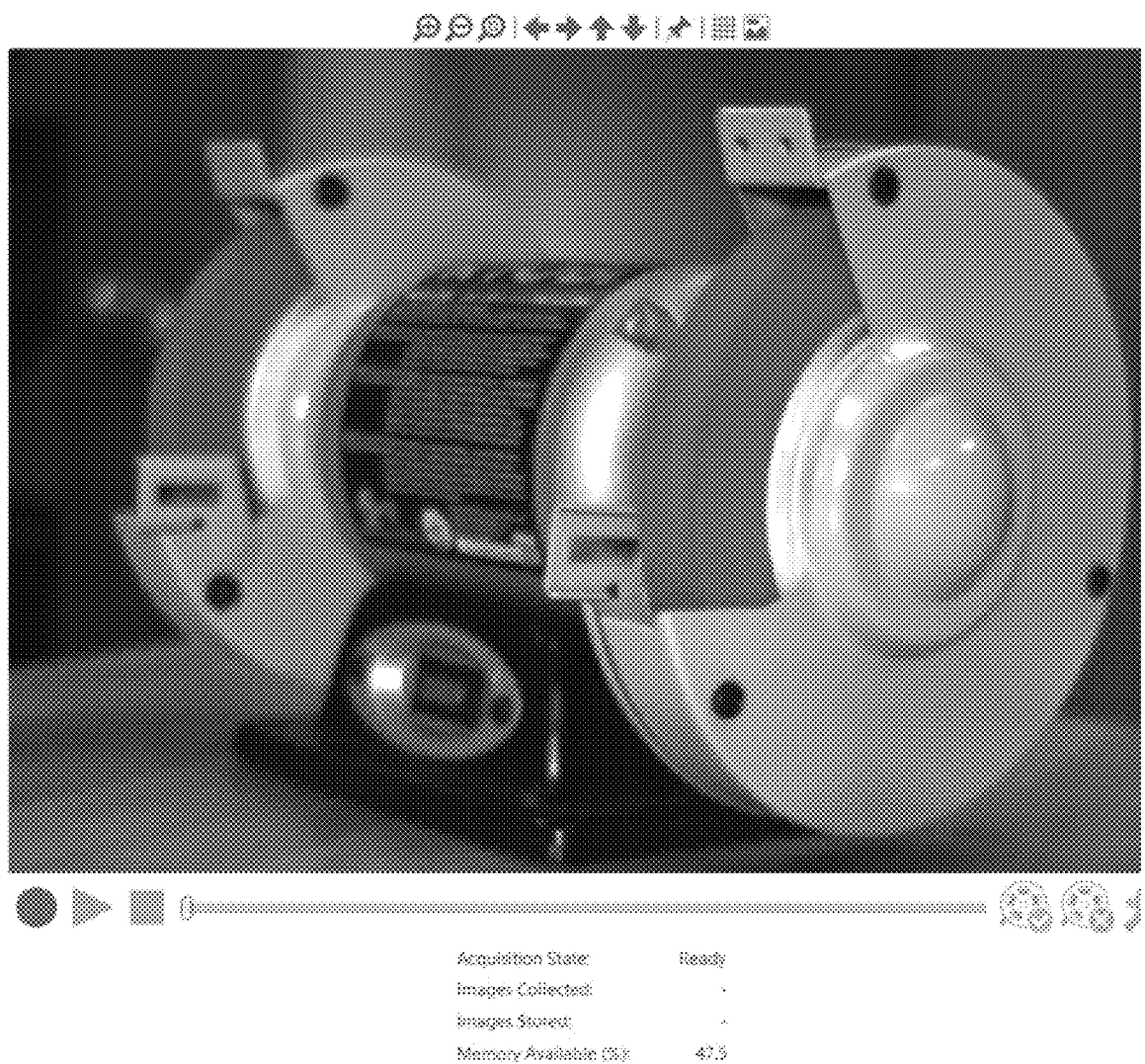
Figure 2A:
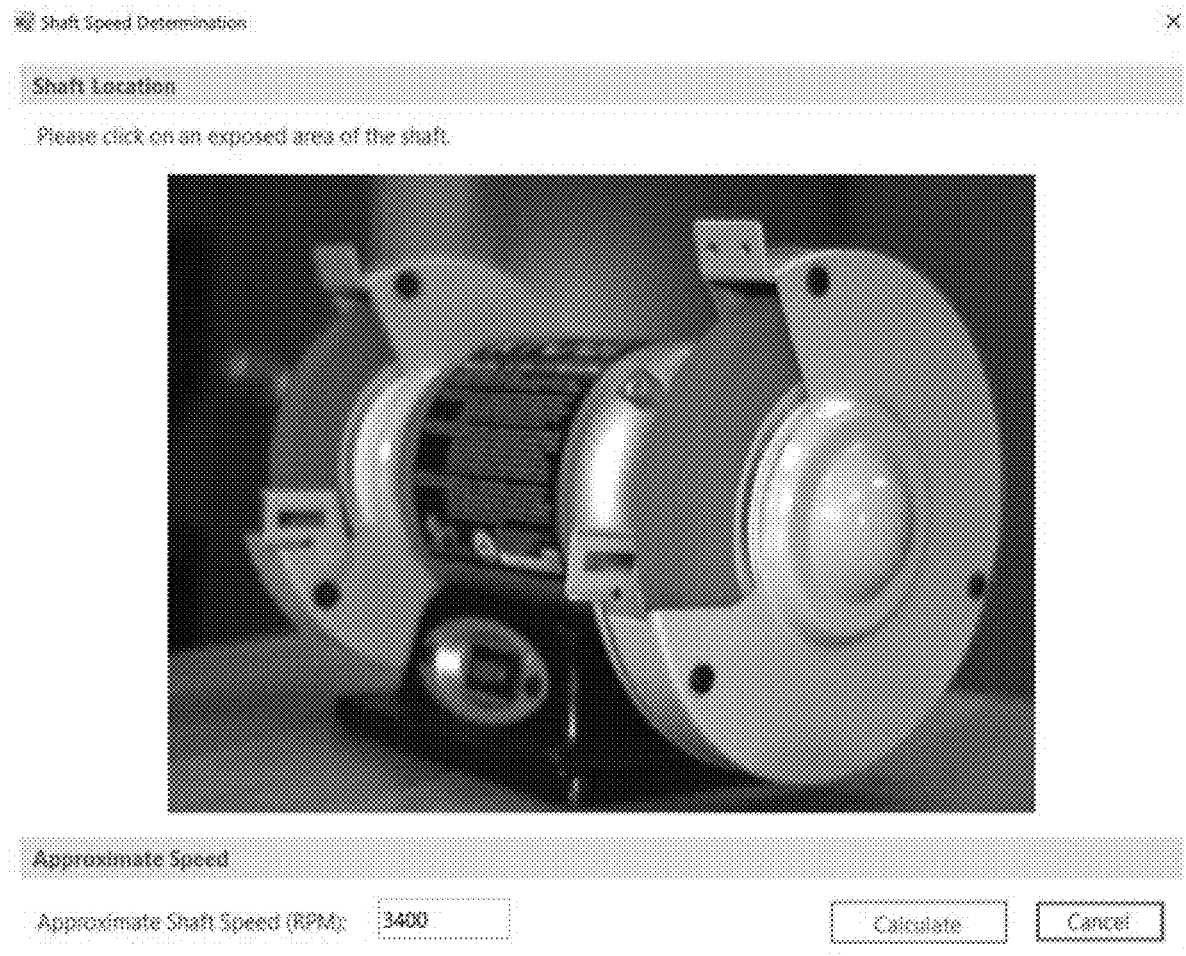
FIG. 2A illustrates an exemplary setup screen for capturing the speed of the asset that appears when a user presses the magnifying glass icon, according to multiple embodiments and alternatives. The user is prompted to click on an exposed area of the shaft and verifies or enters an approximate (i.e., estimated) speed for the component of interest.
Figure 2B:
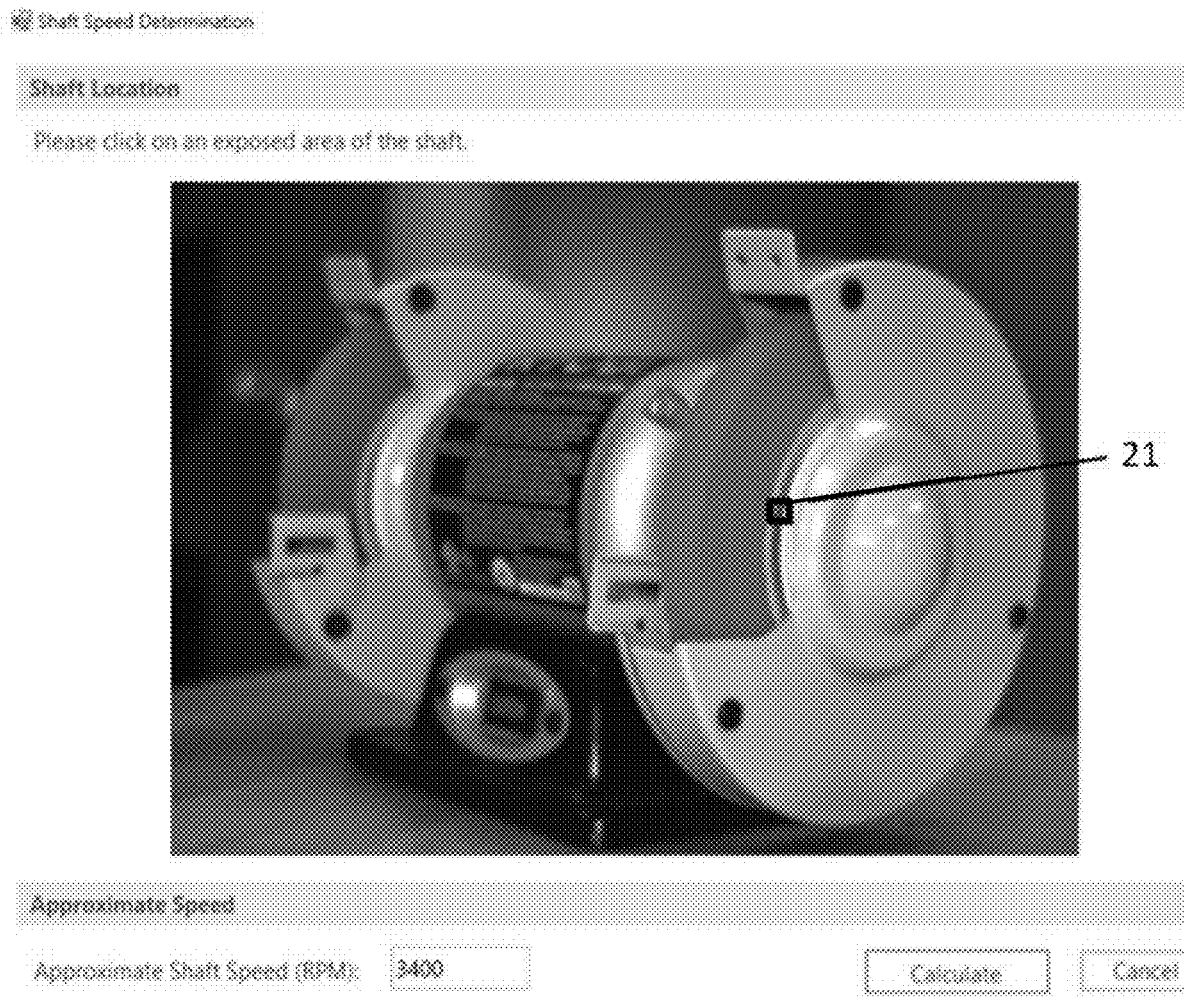
FIG. 2B shows a user-selected region of interest (ROI) 21 of the asset.
Figure 3:
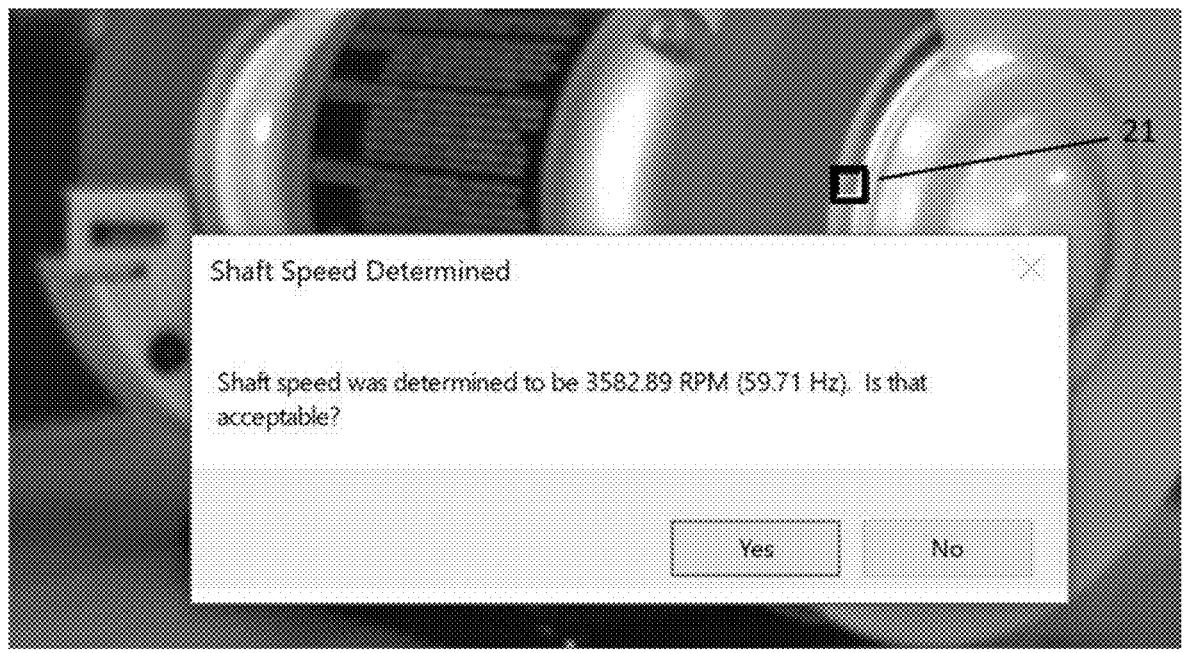
FIG. 3 is a screen that appears after the user presses the Calculate button that displays the measured shaft speed, according to multiple embodiments and alternatives. The user has the option of accepting or rejecting the displayed value and repeating the calculation at a different location on the asset.
Figure 4A:
FIG. 4A and 4B illustrate a setup screen for acquiring the machine recording which appears once the user returns from the calculating the speed of the asset, according to multiple embodiments and alternatives. The Asset Speed will be modified to the measured value if the user accepted the measurement but all other values for the acquisition should be the same as the user established before measuring the asset speed. This screen has been broken into two sections to make the image more legible.
Figure 4B:
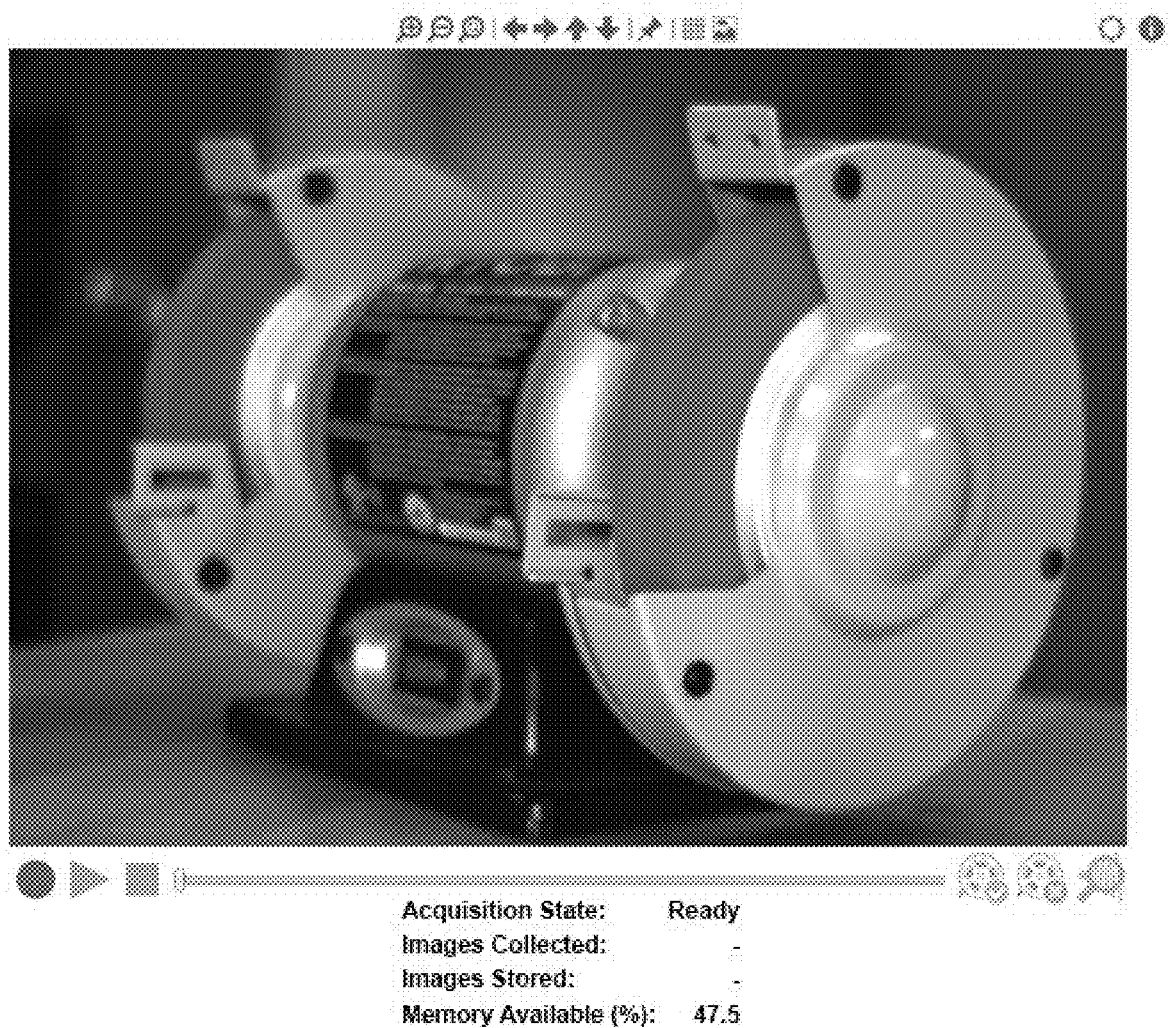

In FIG. 1A and 1B, a screen shown on a display accessible to a user has been broken into two sections in order to make the image more legible. The user establishes the field of view, the focus, lighting, and acquisition setup values to capture the motion of the machine that is of interest. A portion of the rotating component must be visible if the speed of the asset is to be measured. In association with this purpose, FIG. 1A provides several fields for setting Recording Properties, Recording Association, Camera Properties, and Image Properties, as well as a section where Calculated Values measured by the system are expressed. To initiate the measurement of the speed of rotation or reciprocation, the user presses the magnifying glass icon, identified as 11, shown in FIG. 1A by the field, which is labelled "Asset Speed (RPM)" (shown in the Figure with the estimated speed of 3400 RPM input by the user). FIG. 2A shows the setup screen for the shaft speed determination requesting the user to identify the shaft graphically and FIG. 2B shows the position that the user identified and has marked this with a rectangle identified as 21. FIG. 3 illustrates the result of the speed measurement and if accepted this value is placed in the field, Asset Speed (RPM) shown in FIG. 4 and identified as 31.

Machines often present a complex picture on a video recording that represents the operating speed of the machine itself, as well as potentially different operating speeds of components of the machine as they undergo periodic movements (rotational or reciprocating). By way of simple and non-limiting illustration, a machine might include a motor with components captured on the video rotating at first frequency, operatively connected to a rotating shaft that drives one or more gears through a series of rotations at a second frequency. Therefore, it is extremely important to know the exact frequency of rotation or reciprocation associated with the current operation of a machine. This allows an analyst to identify other frequencies present in the vibration measured on the mechanical structure. When diagnosing a specific fault condition, it is important to know which frequencies on a mechanical structure are sub-synchronous, synchronous, or non-synchronous with respect to the operation speed. A synchronous peak which occurs at 12 times the running speed might be associated with a 12-tooth gear; however, a nonsynchronous peak occurring at 12.08 times running speed may be associated with a defect in an anti-friction bearing. The ability to measure the rate of rotation or reciprocation using the same non-contacting camera that will make the vibration measurements on the structure is very cost effective and efficient for the analyst.

In one or more exemplary embodiments, the user follows the typical steps necessary to obtain good recordings of a machine or portion of machine having a rotating or reciprocating component:

1. Position the camera to acquire the perspective of the equipment of interest, containing at least a portion of the rotating or reciprocating component, 2. Focus the camera, and 3. Adjust the aperture; this may require the addition of external light or shielding the field of view in the presence of bright light conditions to achieve acceptable lighting conditions for recording.

Example—Measuring Speed of Asset

Figure 5A:
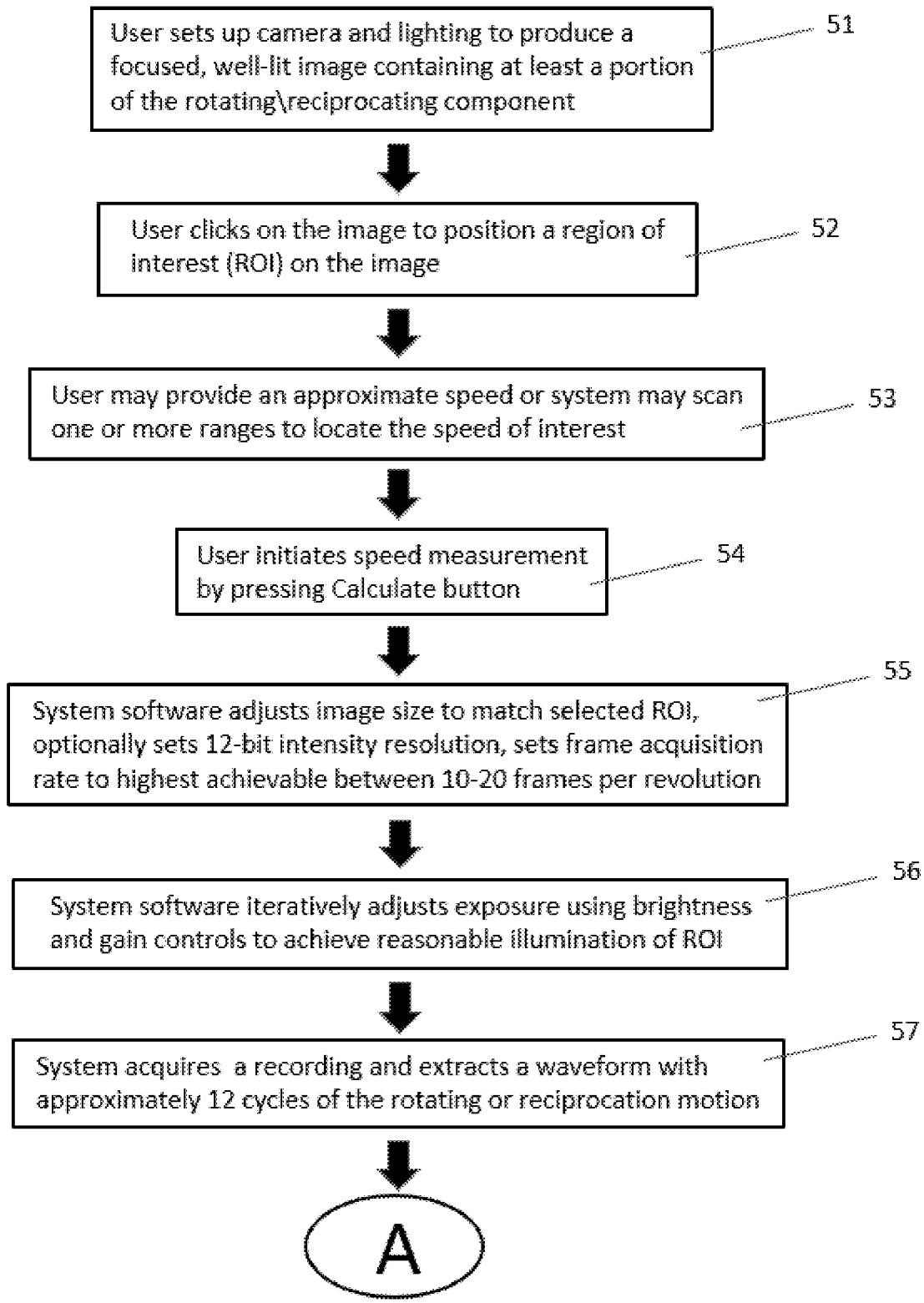
FIG. 5A and 5B provide a flowchart which describes the flow of the software associated with measuring the Asset Speed, according to multiple embodiments and alternatives.
Figure 5B:
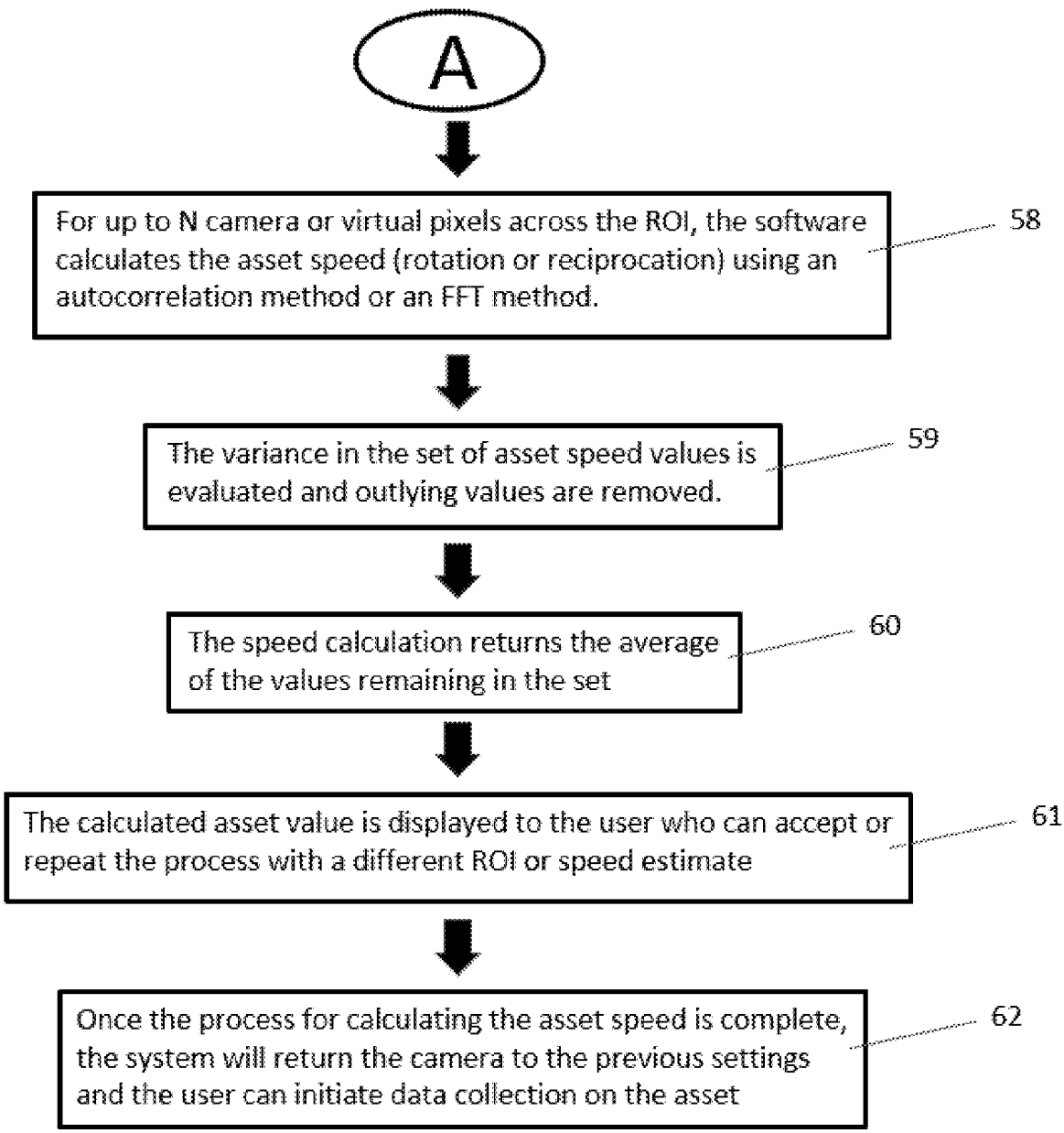

After the camera is set up as desired or needed (FIG. 5A, Box 51), the user selects a location on the component whose speed is to be measured (FIG. 5A, Box 52), provides an estimated speed value or range (FIG. 5A, Box 53), and requests a speed calculation (FIG. 5A, Box 54). In some embodiments, system software optionally performs one or more of the following sequences: adjusts one or more image properties as indicated in FIG. 1A, for example the size of the image, using the user selected region of interest to obtain an improved view of the location being measured, optionally adjusts the bit depth to 12-bit resolution, determines an appropriate acquisition frame rate, (FIG. 5A, Box 55), and automatically adjusts the exposure for the recording (FIG. 5A, Box 56). In an exemplary use, the system collects a recording of approximately 12 cycles of speed data (FIG. 5A, Box 57), and calculates the speed of the identified component. The speed calculation may be performed by examining the peaks in the auto-correlation function or the FFT spectrum from the set of pixels in the ROI of the recording (FIG. 5B, Box 58). Speed values from individual pixels may be discarded if they appear as outliers from the population of speed values calculated (FIG. 5B, Box 59). The final speed value is the average of the values from the retained pixels selected from the ROI (FIG. 5B, Box 60). Once the user accepts the measured asset speed or cancels the speed measurement (FIG. 5B, Box 61), the system returns to motion acquisition setup screen with the same acquisition parameters that had been selected prior to measuring the asset speed (FIG. 5B, Box 62). This embodiment is described in the flowchart provided in FIG. 5A and 5B. As described more fully herein, in some embodiments, this speed of the asset is stored with the recording and this stored speed value can be used to produce order-based spectrum graphs or revolution-based waveform graphs.

Example—Automatically Adjusting Exposure of Camera Before Measuring Asset Speed

Figure 6:
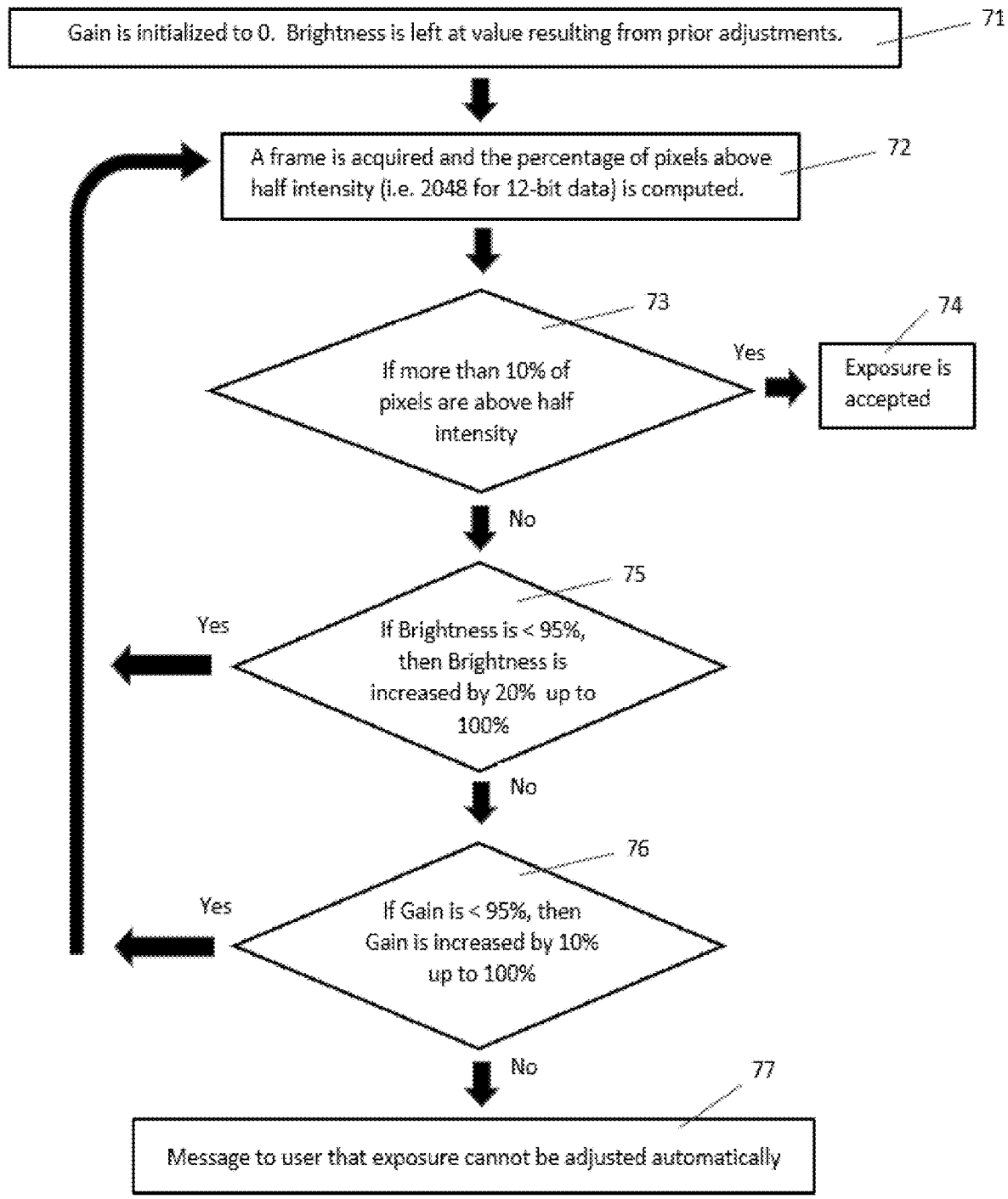
FIG. 6 is a flowchart illustrating automatically adjusting the exposure so that the camera can make an accurate measurement of the asset speed, according to multiple embodiments and alternatives.

The system software in some embodiments can automatically adjust the exposure to improve the asset speed measurement by modifying the brightness and gain settings on the camera. One embodiment providing an automated exposure adjustment method is outlined in the flowchart provided in FIG. 6 and proceeds as follows:

1. Gain is initialized to 0 (FIG. 6, Box 71). Brightness is left at value resulting from prior adjustments (FIG. 6, Box 72).

2. A frame is acquired and the percentage of pixels above half intensity (i.e. 2048 for 12-bit data) is computed.

3. If less than 10% of pixels are above half intensity (FIG. 6, Box 73), attempt to improve the exposure setting.

a. If Brightness is <95%, then Brightness is increased by 20% (limited to 100%) and then repeat from "2" above (FIG. 6, Box 75).

b. Otherwise, if Gain is <95%, then Gain is increased by 10% (limited to 100%) and then repeat from "2" above (FIG. 6, Box 76), with the system providing an automated notification if the exposure cannot be adjusted automatically (FIG. 6, Box 77).

4. If more than 10% of pixels are above half intensity, then exposure is accepted (FIG. 6, Box 74).

Automated adjustment of the exposure minimizes user interaction and the time required to perform the speed measurement. Any other algorithms which result in an acceptable exposure could be employed in alternate embodiments and would remain in the scope of the embodiments described herein. If the system cannot successfully make the speed measurement, then the user will need to select another location on the shaft or manually adjust the exposure.

Example—Autocorrelation Algorithm Facilitating Measurement of Asset Speed

Figure 7:
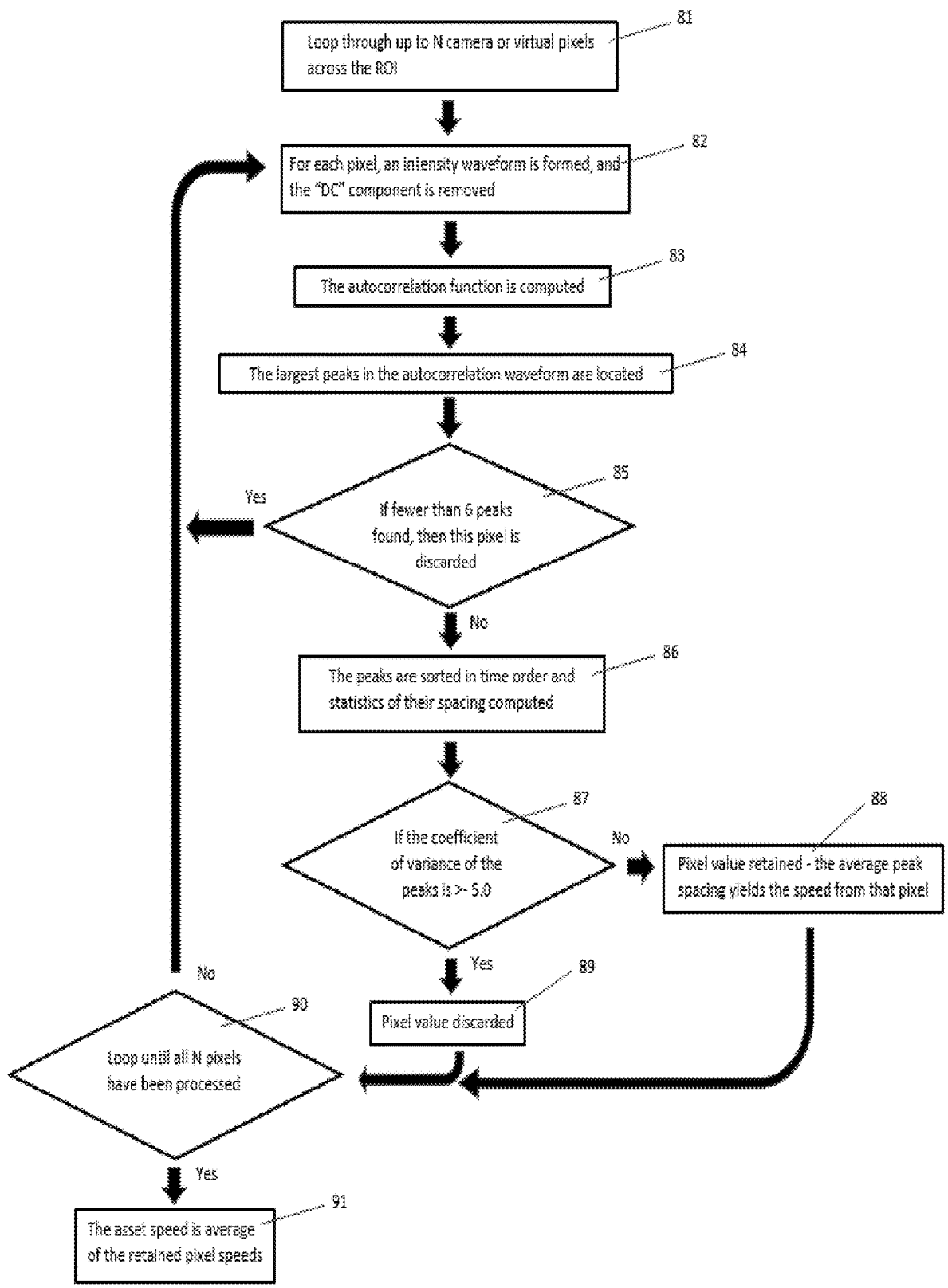
FIG. 7 is a flowchart for making the asset speed measurement using an autocorrelation algorithm, according to multiple embodiments and alternatives.

In some embodiments, after the exposure has been automatically adjusted, then a recording is acquired which will provide waveforms with approximately 12 revolutions of the shaft (128-1024 samples per waveform). For a set of N pixels (camera pixels or virtual pixels) (FIG. 7, Box 81) across the ROI, 1. Intensity waveforms are formed, and "DC" is removed from them (FIG. 7, Box 82),
2. The autocorrelation waveform is computed (FIG. 7, Box 83),
3. The largest peaks in the autocorrelation waveform are located (FIG. 7, Box 84). If fewer than 6 peaks are found, the pixel is discarded,
4. The peaks are sorted in time order and statistics of their spacing computed. If the coefficient of variance of the peaks is >-5.0, the pixel is discarded (FIG. 7, Box 85).
5. The average peak spacing yields the speed from that pixel (FIG. 7, Box 88).
6. The asset speed is average of the retained pixel speeds ((FIG. 7, Box 86-91).

The resulting asset speed is displayed to the user who then accepts or rejects it. A flowchart of this algorithm is shown in FIG. 7. The values for the number of revolutions collected, the total frames acquired, and the number of pixels searched could be varied in alternate embodiments and remain within the scope of embodiments described herein. In some embodiments, virtual pixels are constructed from horizontal or vertical line segments in the region of interest, from a user drawn line segment from a contiguous block of pixels, or from a set of pixels with high intensity changes. In alternate embodiments, the estimated asset speed might be specified in ranges such as "Below 30 Hz," "Below 90 Hz," or "Above 90 Hz." In mode of use for embodiment described herein, the algorithm could be applied iteratively over different possible speed ranges such that an estimated speed would not be required.

Example—Peak Location Algorithm Based on Frequency Spectrum

In an alternate embodiment, the practice of which is described below in exemplary fashion, the asset speed is determined by locating the peaks in FFT frequency spectrum of the waveforms with approximately 12 revolutions of the shaft (128-1024 samples per waveform). For a set of N pixels (camera pixels or virtual pixels) (FIG. 8, Box 101) located within the ROI.

Figure 8:
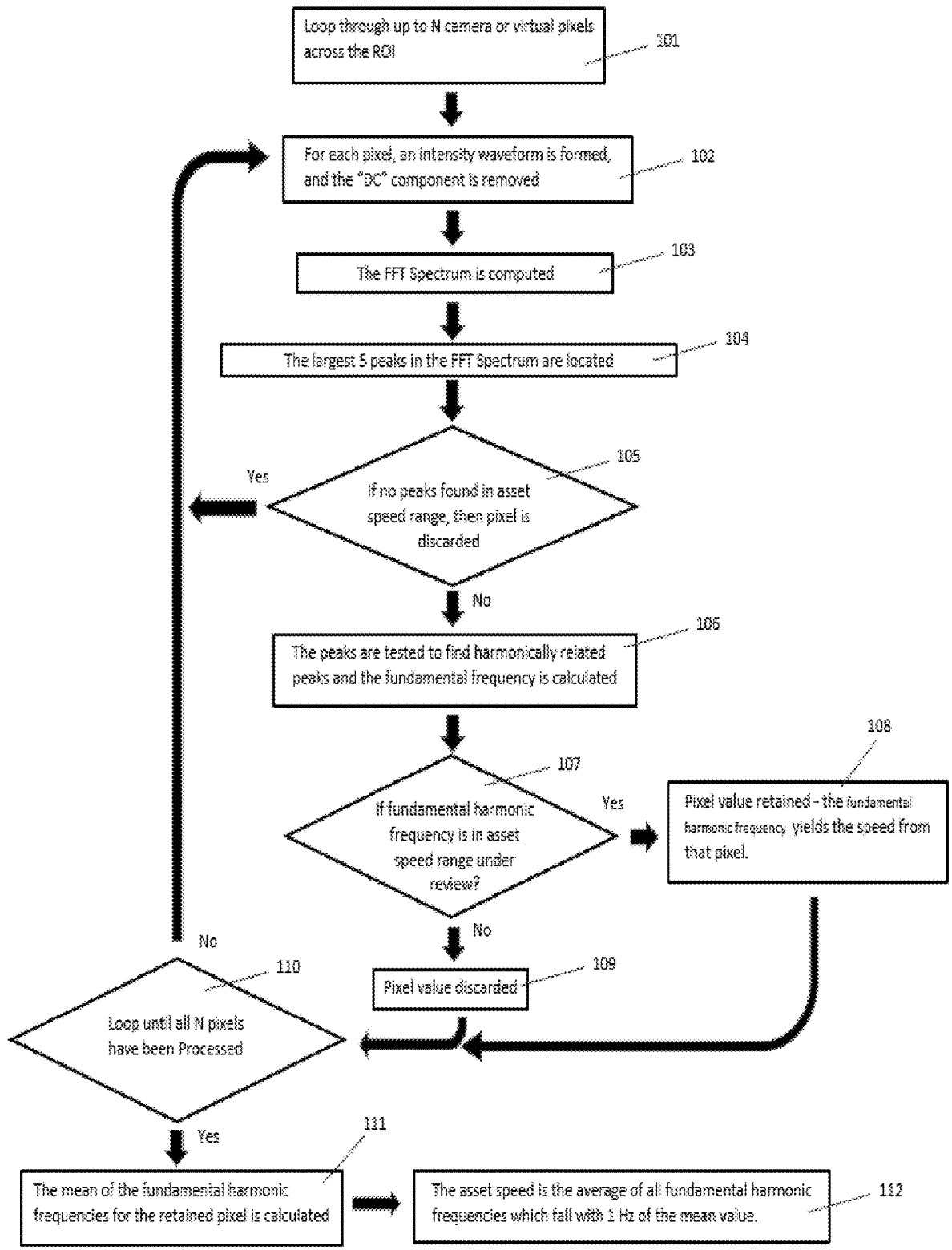
FIG. 8 is a flowchart for making the asset speed measurement using a peak location algorithm and the frequency spectrum, according to multiple embodiments and alternatives.

1. Intensity waveforms are formed, and "DC" is removed from them (FIG. 8, Box 102),
2. The FFT frequency spectrum of the intensity waveform is computed (FIG. 8, Box 103),
3. The largest 5 peaks in the FFT spectrum are located accurately using FFT windowing parameters (FIG. 8, Box 104) as known in the art. If no peaks are located within a reasonable range of the estimated asset speed are found, the pixel is discarded (FIG. 8, Box 105),
4. The peaks are tested to find harmonically related peaks and the fundamental frequency of the family is calculated (FIG. 8, Box 106). If the fundamental harmonic peak does not fall in the asset speed range under consideration, the pixel is discarded,
5. The mean value of the retained fundamental harmonic frequency values is formed and any pixels whose value fundamental frequency differs by more than 1 Hz is discarded from the set,
6. The asset speed is average of the fundamental harmonic frequencies for the retained pixels (FIG. 8, Boxes 106-112).

The resulting asset speed is displayed to the user who then accepts or rejects it. An exemplary flowchart of this algorithm is shown in FIG. 8. The values for the number of revolutions collected, the total frames acquired, the number of peaks located, the permissible asset speed range, and the number of pixels searched could be varied in alternate embodiments and remain within the scope of this disclosure. In some embodiments, virtual pixels are constructed from horizontal or vertical line segments in the region of interest, from a user drawn line segment from a contiguous block of pixels, or from a set of pixels with high intensity changes. Other embodiments could use the largest peak in the defined asset speed range or locate the difference in frequency between located peaks as the basis for identifying the asset speed. In alternate embodiments, the estimated asset speed might be specified in ranges such as "Below 30 Hz," "Below 90 Hz," or "Above 90 Hz." In another embodiment, the algorithm could be applied iteratively over different possible speed ranges such that an estimated speed would not be required.

This process is improved by using located peak values rather than the nominal peak value which is identified by the frequency line in the spectrum with the highest amplitude. In a spectrum calculated with 1 Hz resolution, the nominal peak value might be 22 Hz because the frequency line at 22 Hz has the highest amplitude of 2. The amplitude value at 21 Hz might be 0.05 and the line at 23 Hz might be 1.90 indicating that the true peak frequency lies between 22 Hz and 23 Hz. It is well known in signal processing art, that the true frequency value can be estimated more accurately by applying formulas that consider the windowing function used when calculating the FFT frequency spectrum. In the case above, the true value would be about halfway between the two lines giving a located peak frequency of 22.4 Hz. The FFT could be constructed using any number of windows such as the Uniform, Hanning, Hamming, Blackman-Harris, Kaiser-Bessel, or others. More accurate frequency estimates of the peak location can be calculated using the parameters that are characteristic of the respective windows. An improved location of the peak frequency can also be accomplished by applying any number of well-known fitting algorithms to the center line in the peak and the 2 lines on either side. The generic fitting algorithms are generally not as accurate as using the algorithm that takes into account the FFT windowing functions. Demonstrating the broad nature of the descriptions herein, alternative embodiments could use any of the methods discussed or those obtaining equivalent improvements in locating the peak frequency values. Nominal peak frequency values can also be used but would not provide as reliable results in some cases. When calculating the ratio of the frequency of two peaks to determine if they are harmonically related (integer multiples of the fundamental frequency), located peak values will result in a closer match to integer values and thus correctly identify harmonic family members.

Figure 9:
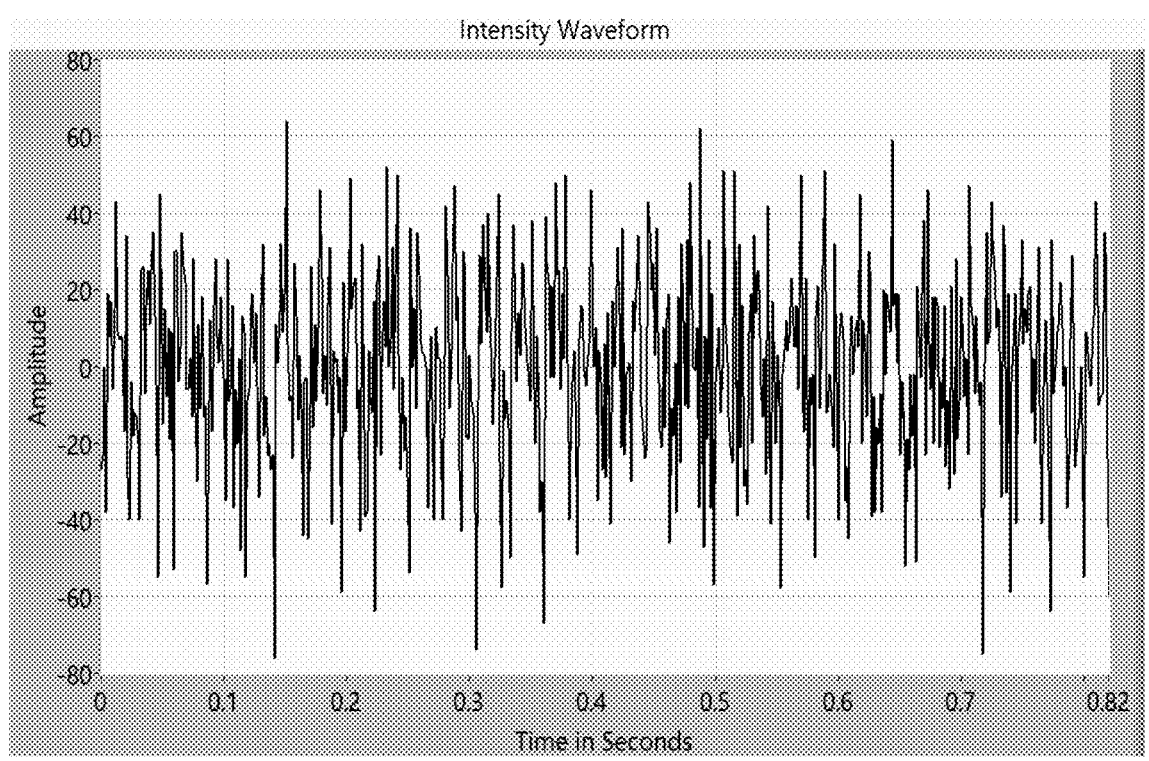
FIG. 9 is a graph of the intensity waveform from a pixel on the rotating or reciprocating component, as generated in the practice of multiple embodiments and alternatives.
Figure 10:
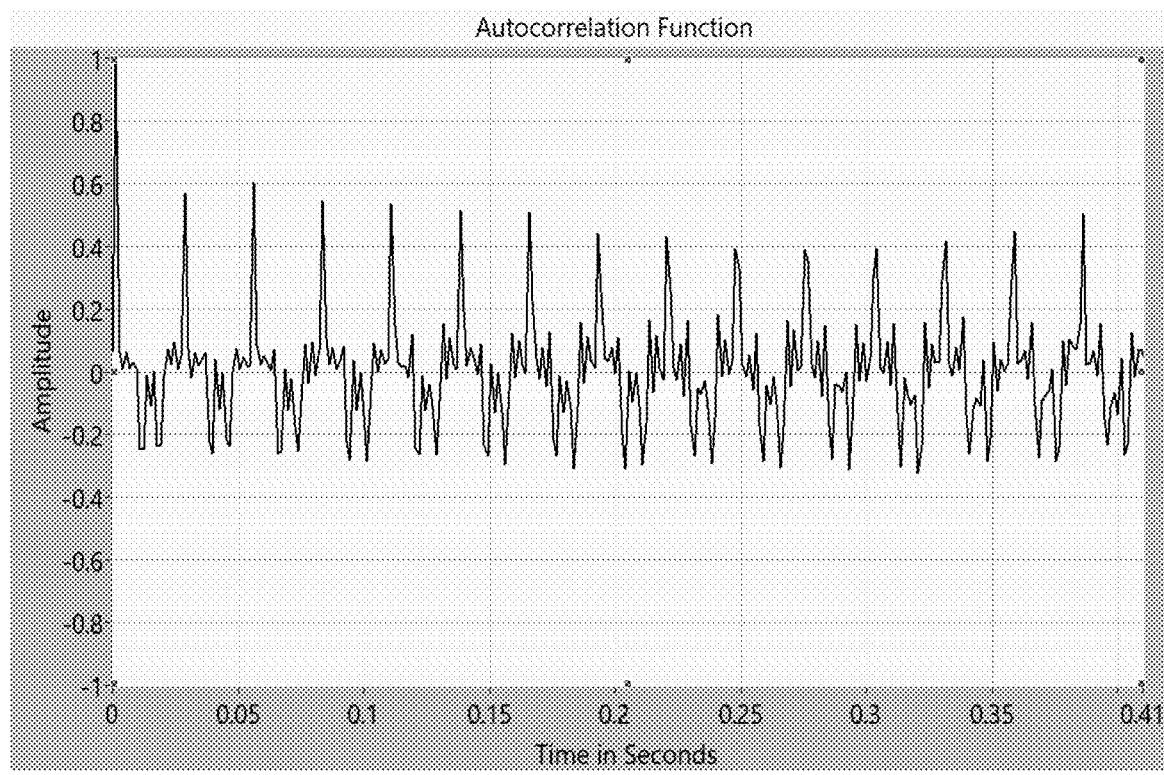
FIG. 10 is a graph of the autocorrelation function of the intensity waveform from a pixel on the rotating or reciprocating component, as generated in the practice of multiple embodiments and alternatives.
Figure 11:
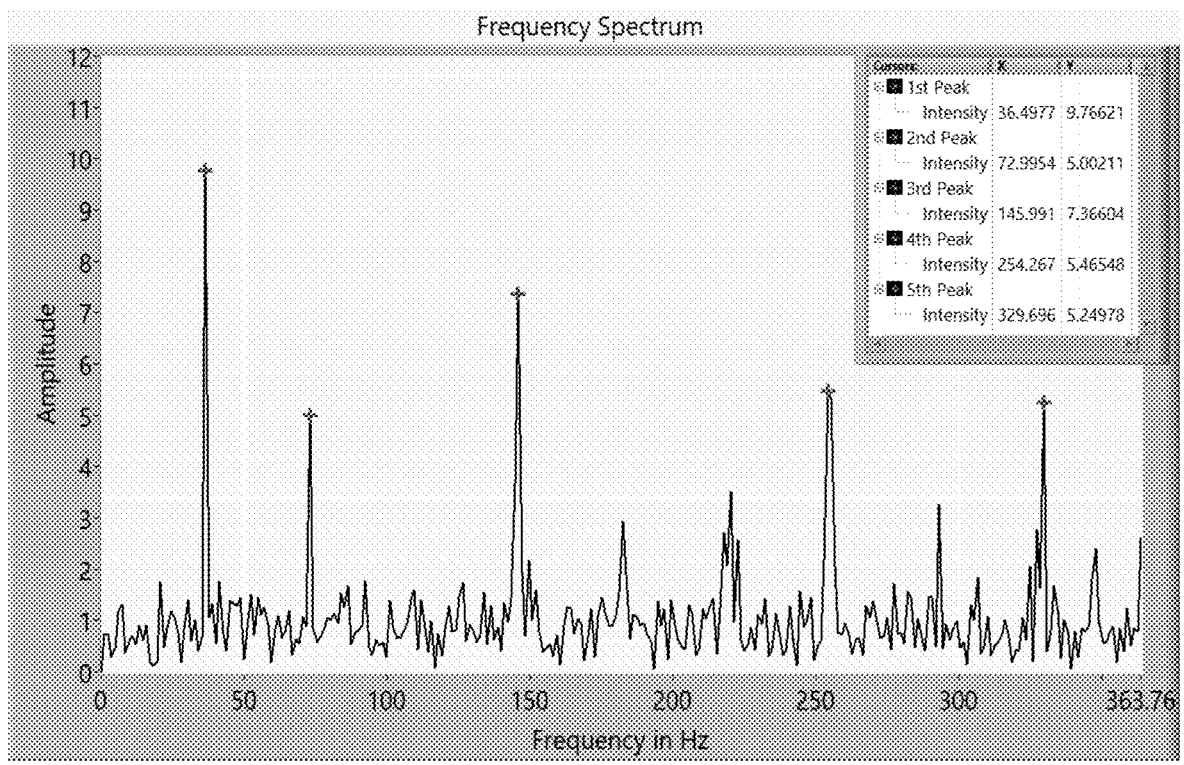
FIG. 11 is a graph of the frequency spectrum of the intensity waveform from a pixel on the rotating or reciprocating component, as generated in the practice of multiple embodiments and alternatives.

The intensity waveform from one of the pixels in the region of interest located on the rotating or reciprocating component is shown in FIG. 9. This particular pixel has useful information as seen when the autocorrelation function of the intensity waveform is calculated as shown in FIG. 10. The autocorrelation graph from this pixel exhibits clear peaks spaced uniformly in time. Locating the positive peaks on this graph, calculating the average difference in time, and calculating the reciprocal of this value will provide a frequency estimate for the strongest repeating pattern in the signal. A frequency spectrum for the waveform from this pixel is shown in FIG. 11. This spectrum shows a number of peaks which are harmonically related. Some of the larger peaks have been identified with a cursor mark at the top of the peak and their frequency values are provided in the legend. The 1st peak (between 0-50 Hz according to the legend in FIG. 11) is the fundamental frequency (FF) of a harmonic family and the 2nd peak (between 50-100 Hz) is 2×FF, the 3rd peak (between 100-150 Hz) is 4×FF, the 4th peak (between 250-300 Hz) is 7×FF, and the 5th peak (between 300-363.76 Hz) is 9×FF. In this case, the fundamental frequency of the harmonic family, or the largest peak, or the normalized difference between family members would all yield an estimate of the asset speed. The sorting of estimates from many pixels, removing outliers automatically based on statistical limits the system is configured to apply to the population of calculated values, and combining the values from remaining pixels improves the likelihood of obtaining the most accurate value for the asset speed.

In an alternate embodiment, the algorithms described above could be applied to the regular video recording which are captured to measure the orthogonal vibration in the field of view. In the situation where the rotating or reciprocating element is in the field of view and the data acquisition parameters are sufficient to enable resolving the rate of rotational or reciprocation, the rate of repetition could be measured for a ROI identified by the user.

Figure 12A:
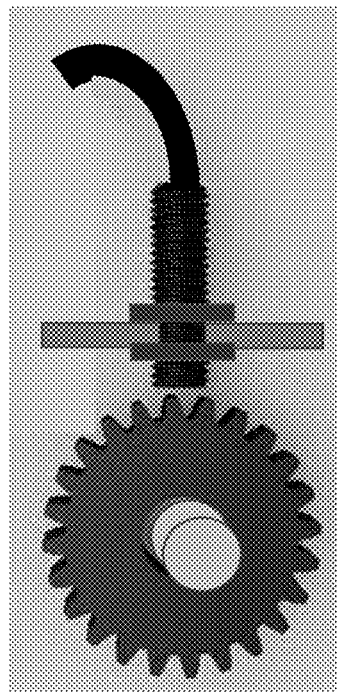
FIGS. 12A-12B show the test setup for a torsional measurement using an internal gear or mounted disk or gear wheel, according to multiple embodiments and alternatives.
Figure 12B:
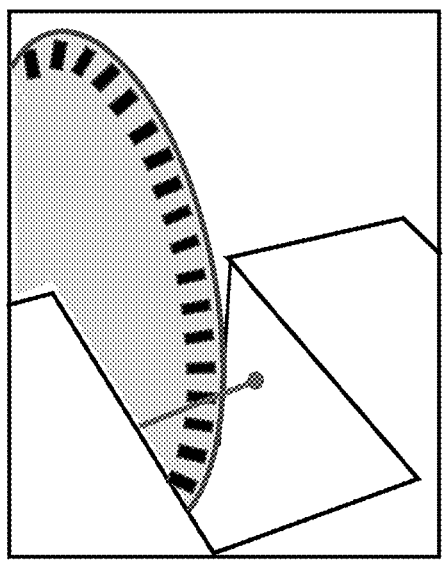
Figure 13:
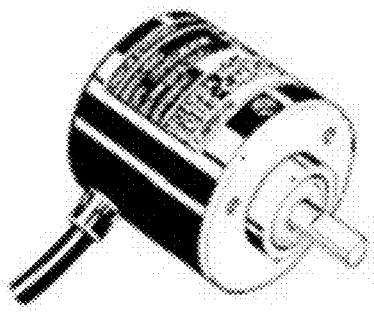
FIG. 13 shows example shaft encoder accessories used when making traditional torsional measurements.
Figure 13:
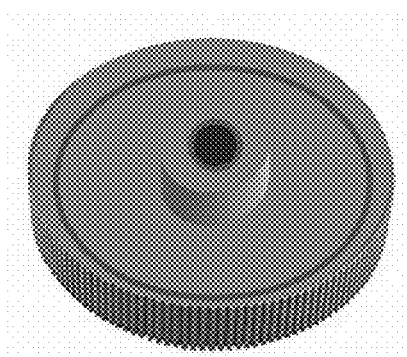
Figure 13:
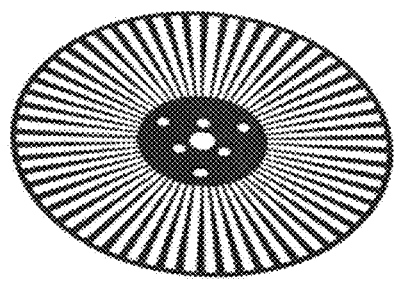

In other aspects of the present disclosure, in accordance with multiple embodiments and alternatives, a user in the operation of present embodiments measures the instantaneous speed of rotation of an element on a mechanical structure, a machine or machine component without contacting the structure using the same camera that will be employed to investigate the dynamic motion of the mechanical structure. Measurement of the instantaneous speed at various points during each revolution of the shaft allows the user to investigate the angular or torsional vibration characteristics of the mechanical system. This measurement requires access to a gear wheel which is integral or attached to the shaft of interest or the application of a patterned or graduated tape to a visible position on the shaft. FIGS. 12A and 12B show several test setups for making torsional measurements using an internal gear (FIG. 12A) and a mounted disk (FIG. 12B). FIG. 13 shows a typical integral shaft encoder at the top of the figure and some graduated wheels for external mounting which can be employed for making torsional measurements. Clearly, this approach to making a torsional measurement requires that the machine under test be physically modified to make the desired measurement. The application of a graduated tape to the shaft is generally less difficult and can be monitored with an optical sensor that may be located at greater distances from the machine than the proximity sensors used with gear wheels. The optical or proximity sensors must be sampled very rapidly in order to determine the exact interval between pulses.

Figure 14:
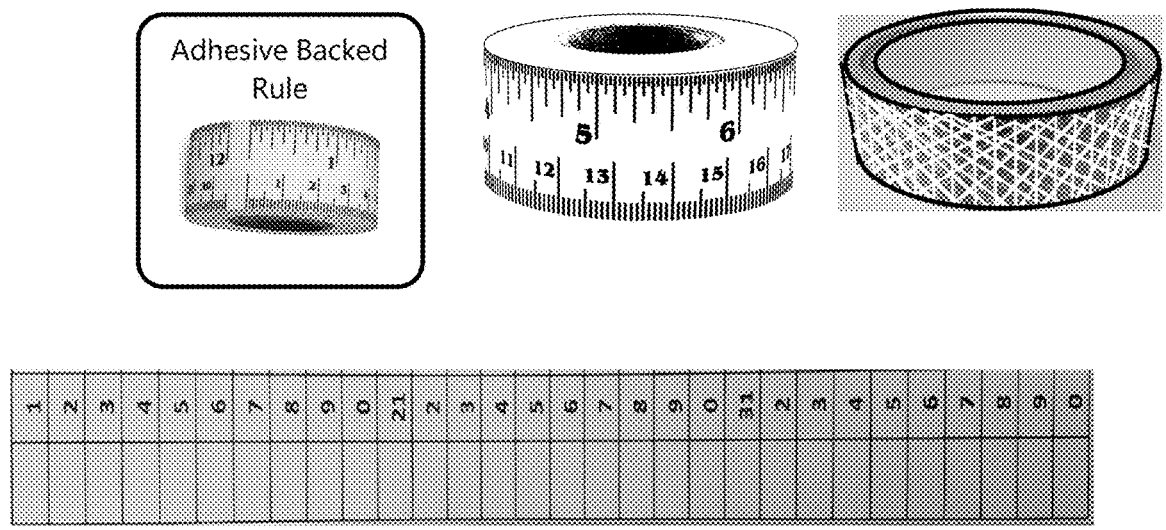
FIG. 14 shows some examples of adhesive tape with graduations or patterns that can be wrapped around the shaft when making torsional measurements.
Figure 15:
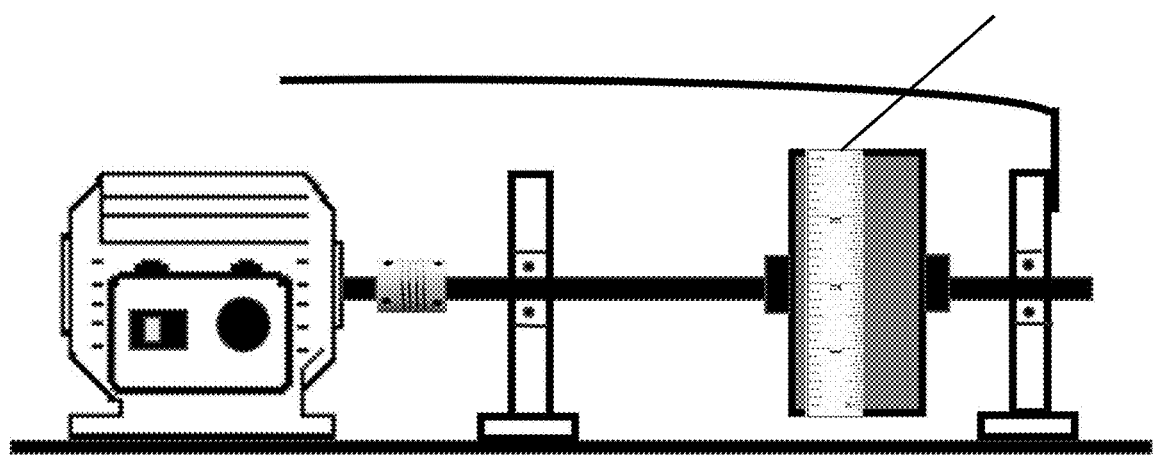
FIG. 15 illustrates a torsional vibration measurement setup using digital photography to record a patterned tape wrap applied to a disk on rotor test kit, according to multiple embodiments and alternatives.
Figure 16:
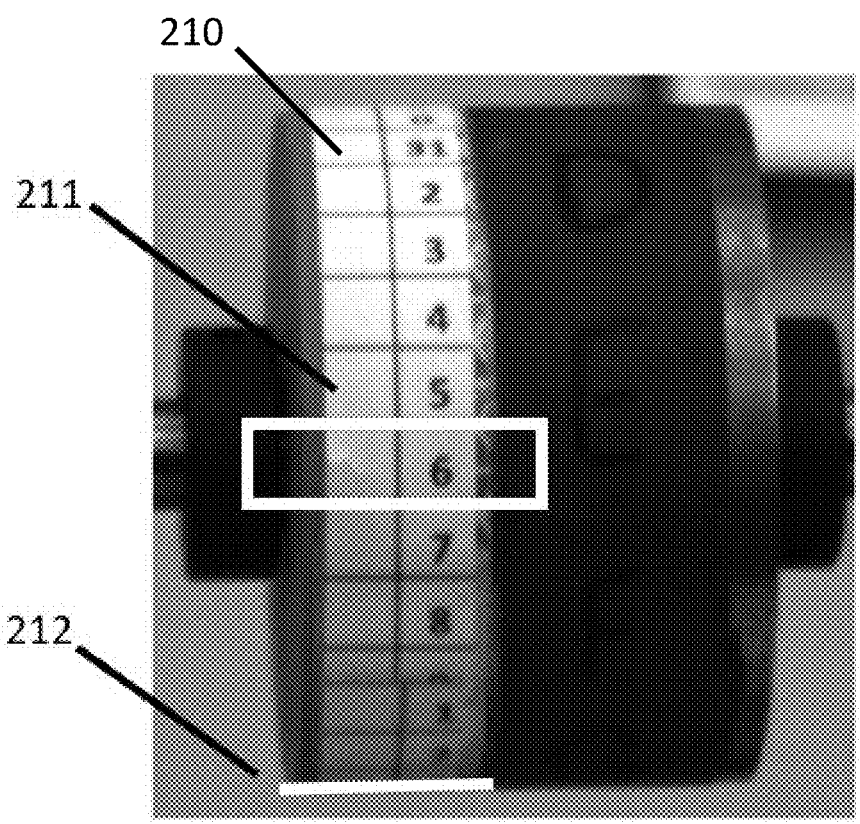
FIG. 16 is a still frame from a digital recording of torsional vibration measurement made using a tape with graduated lines attached to a disk on a shaft, as generated in the practice of multiple embodiments and alternatives.
Figure 17:
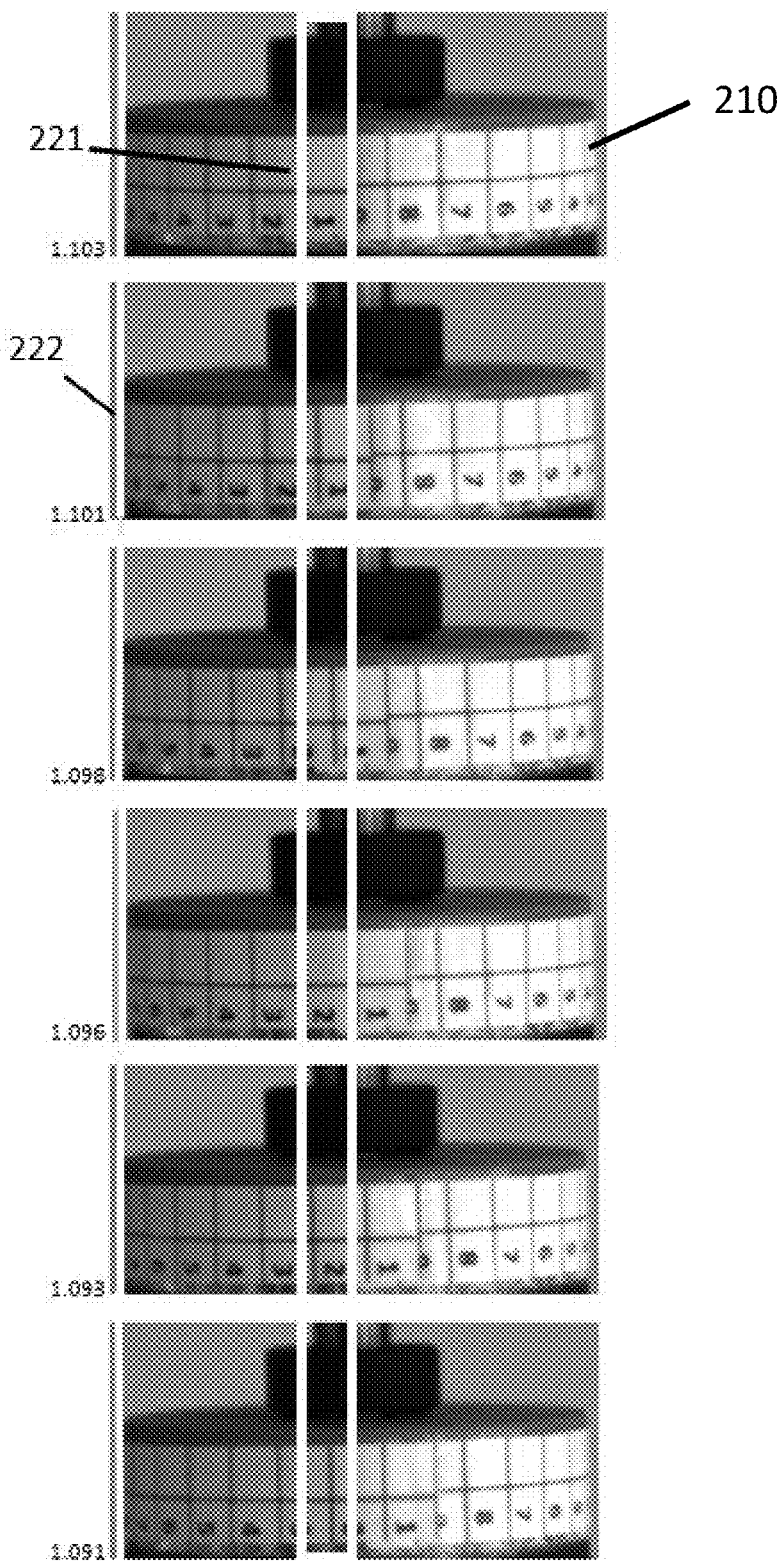
FIG. 17 is a series of consecutive frames showing the change in position from a video recording of the graduated wrap applied to the shaft to make torsional vibration measurements, according to multiple embodiments and alternatives.

When using a video camera to make torsional measurements, the tape applied could have graduated lines or a repeating pattern, such as shown in FIG. 14. FIG. 15 shows a rotor test kit which has a patterned tape applied to a disk, identified as 201, attached to the shaft for making torsional measurement using a video camera to collect the data. FIG. 16 is one frame for a video recording with a graduated tape applied to the same disk on the rotor test kit. The use of the tape has some advantages since it provides a position on the shaft to which all other rotational positions can be referenced. A gear wheel could provide the same result if one tooth was marked at a location visible to the camera. In most cases, the exact distance between gear teeth or the graduations or pattern on the tape are known or can be measured. Unlike systems which demodulate the pulses generated each time a tooth or line passes under the sensor, the use of the camera allows an exact determination of the instantaneous speed or the absolute change in angular position for each frame that is recorded. FIG. 17 presents a series of consecutive frames from a video recording showing the change in position of the graduated wrap. The distance that the shaft has moved can be determined my measuring the distance that any of the several numbered intervals has moved between frames. This change in distance can be converted to degrees or instantaneous speed. At the point that the overlap of the tape occurs, the movement of the interval to the right or left can be used to handle the discontinuity in the graduated lines. In fact, the change in distance for several consecutive divisions between the graduated lines could be determined and averaged to give more accurate values for each frame. For systems which are demodulating the graduated lines on the tape, rapid sampling rates are needed to make a precise measurement when the lines pass the sensor, for example 100 samples between each division to get 1% accuracy in the measurement. It will be appreciated that current embodiments allow for the use of much lower sampling rates for the video recordings due to the spatial information inherent in the recording which shows the position of many lines in each frame. The spatial information in each frame allows a very precise measurement of the movement at each frame collected.

In a use case shown in FIGS. 16 and 17, the tape 210 is calibrated to divisions that measure 0.3221 inches or 8.182 mm. There are 28 full divisions (N) and a fractional division (F) of 0.4 at the overlap of the tape that cover the circumference of the shaft yielding a circumference of 9.1476 inches and a diameter of 2.912 inches for the disk where the tape is attached. In this case, each division represents an arc of 12.676 degrees. The rectangle in each figure (identified as 211 in FIGS. 16 and 221 in FIG. 17, respectively) is exactly the size of one division, and a reference line (identified as 212 in FIGS. 16 and 222 in FIG. 17, respectively) is located at the outer edge of the disk. The camera can be calibrated very accurately since the width of each division is known precisely. In FIG. 17, the numbers moving vertically along the page (ranging from 1.091 to 1.103) represent the times in milliseconds when the frames were collected as the shaft rotated. In an exemplary embodiment, a process to measure motion would follow these steps:

1. On a selected frame, the user optionally identifies the edge of component by drawing a reference line (212 in FIG. 16; 222 in FIG. 17) in order to measure vibration perpendicular to the graduated division lines, 2. On the selected frame, the user identifies the region where the torsional motion will be measured by drawing the reference rectangle (identified as 211 in FIG. 16 and as 221 in FIG. 17), 3. The system software can optionally match the references to the side of the disk and the closest lines of the selected division to achieve a finer resolution in the position of user selected references.

4. Count number of whole divisions (N) and measure fraction division (F), visually or from video, 5. Determine circumference (C) and diameter (D) of component being monitored, 6. Set the sampling rate to be the larger of:
   a. 1.5*N.F*RPS or
   b. 2.5 times the number of orders of interest, 7. Collect the number of samples or frames equal to 3 times the reciprocal of the lowest sub order (1/M) of interest times the sampling rate: Total Samples=3*SR*M, 8. Determine change in arc for the division passing through the reference rectangle for each frame (sample) recorded:

a. Use the fractional movement of the lines across this reference zone if processing a full tape division, b. If a partial division (tape overlap) enters the zone, then move to preceding full tape division to determine distance moved in the interval or the arc of the motion, 9. Movement of the wheel due to vibration can be removed by measuring the motion at the reference line (212 in FIG. 16; 222 in FIG. 17) (edge of the component) subtracted from the movement the division line measured at the rectangular zone (211 in FIG. 16; 221 in FIG. 17).

Figure 18:
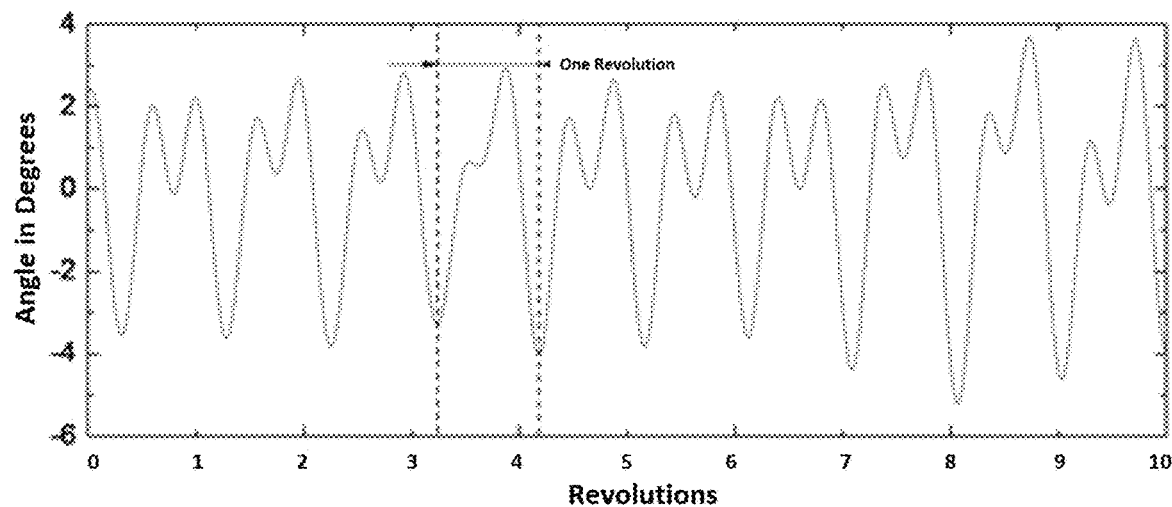
FIG. 18 is a graph of torsional vibration waveform data derived from a digital video recording, as generated in the practice of multiple embodiments and alternatives.
Figure 19:
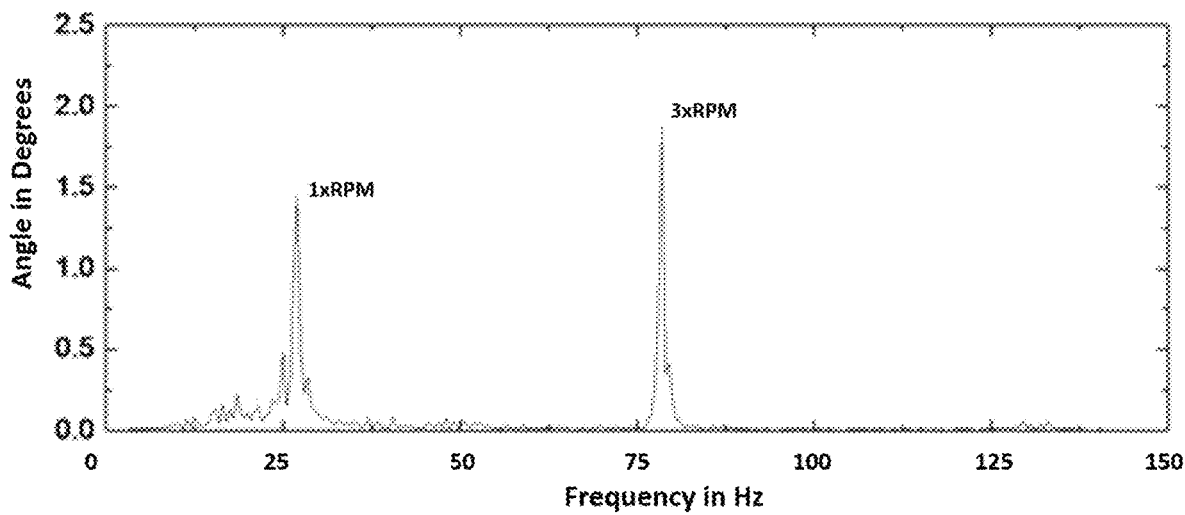
FIG. 19 is a graph of a torsional vibration frequency spectrum calculated from a digital video recording, as generated in the practice of multiple embodiments and alternatives.

Further, in accordance with the embodiments herein, FIG. 18 presents a graph of the torsional measurement made by using data from a video recording and FIG. 19 is a frequency spectrum of the torsional waveform. The video recording could capture data from positions on multiple locations on a machine where tape had been applied. In this case, a single video could measure the torsional motion at two or more locations and provide differential torsional measurements. In other embodiments, it might be necessary to use two or more cameras whose sampling has been synchronized together to get data from all positions if all locations cannot be captured in the field of view for one camera. If the tape applied to the shaft had 24 divisions or more around the shaft, then recording at frame rates which are 24×Speed would provide the ability to measure torsional vibrations out to 12 orders of the running speed. If 10 revolutions of the shaft were recorded, then fractional orders down to $1/10$ of the running speed can be determined. The present embodiment can provide both steady state measurements and track changes during transient conditions.

It will be appreciated that this embodiment describes the use of targets or markings affixed to the shaft. In some instance measurements may be possible on pre-existing markings on the shaft. These marking may be from but not limited to normal wear on the shaft, damage to the shaft, scuff or scratches or marking made on the shaft by an individual.

In some instances, the displacements of a marking on the shaft will be made directly from the apparent distance traveled by the mark as seen by the camera. It will be appreciated that a shaft measurement can be corrected for the curvature of the shaft such that apparent motion on the horizon of the shaft can be compared to the motion at the nearest point of the shaft to the camera. When a mark is moving near the horizon of the shaft a given angular displacement will appear to travel a shorter distance as viewed from the camera as compared to the same angular displacement moving at the nearest point of the shaft to the camera. By accounting for this curvature, the angular displacement can be normalized and compared across the entire shaft. The radius of the shaft may be entered into the software to make this correction or the camera may make the measurement of the shaft radius from the image itself if the shaft is visible and the scale of the image is known.

Several exemplary claims are set forth herein but are not intended to place boundaries on the full range of embodiments and alternatives described and provided for herein, nor are these intended to waive or otherwise circumscribe any potential claims that could be pursued in a later application claiming the benefit of the teachings and disclosures herein. A claim expressed in this filing as a method also could represents a system that performs such a method or other methods, and a system claim if recited also could represent a method of operation executed by said system.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for calculating a speed of rotation or reciprocation of a machine or machine component while rotating or reciprocating, using a video recording acquired with a camera of a scene within a field of view (FoV) that includes the machine or machine component, the method comprising:

configuring a processor to receive input from a user through a graphical user interface (GUI), wherein the input identifies a region of interest (ROI) or a line segment in the scene including pixels of the video recording depicting at least a portion of the machine or machine component as it is rotating or reciprocating;

configuring the processor to automatically select a retained set of pixels in the ROI or the line segment, wherein the retained set of pixels comprises pixels from the user identified set of pixels out of the FoV;

configuring the camera to automatically adjust a frame rate sufficient to capture frequencies in a predetermined speed range and to automatically adjust an exposure to improve a level of contrast of the retained set of pixels;

wherein the processor captures a video recording of sufficient length to capture N cycles at a lowest speed in a predetermined speed range, the video recording comprising video images which are divisible into video frames each of which is divisible into a plurality of pixels and storing the video recording in a memory operatively connected to the processor that executes computer-readable program instructions;

further configuring the processor to extract a waveform representing a variation in an intensity of the retained set of pixels as the machine or machine component is rotating or reciprocating, and to collect and store waveform and pixel intensity data from the user identified set of pixels identified by the user in the ROI or the line segment; and calculating the speed of rotation or reciprocation of the machine or machine component as an average of a plurality of speed values for a plurality of pixels from the user identified set of pixels, wherein one or more of the plurality of pixels exhibits a periodicity of the rotational or reciprocal motion of the machine or machine component.

\* \* \* \* \*